US009105241B2

(12) United States Patent
Chou

(10) Patent No.: US 9,105,241 B2
(45) Date of Patent: Aug. 11, 2015

(54) STRUCTURE OF LIGHT EMITTING DEVICE ARRAY AND DRIVE METHOD FOR DISPLAY LIGHT SOURCE

(76) Inventor: Chen-Jean Chou, New City, NY (US)

( * ) Notice: Subject to any disclaimer, the term of this patent is extended or adjusted under 35 U.S.C. 154(b) by 757 days.

(21) Appl. No.: 12/774,079

(22) Filed: May 5, 2010

(65) Prior Publication Data

US 2010/0283939 A1 Nov. 11, 2010

Related U.S. Application Data

(60) Provisional application No. 61/176,887, filed on May 9, 2009.

(51) Int. Cl.

| | |
|---|---|
| ***G02F 1/1335*** | (2006.01) |
| ***G09G 3/34*** | (2006.01) |
| *G09G 3/36* | (2006.01) |

(52) U.S. Cl.

CPC ............ *G09G 3/3406* (2013.01); *G09G 3/3648* (2013.01); *G09G 2320/0646* (2013.01)

(58) Field of Classification Search

CPC .................... G09G 2320/0646; G09G 3/3406; G09G 3/3648

USPC ................ 345/89, 204, 102, 87, 96, 690–691

See application file for complete search history.

(56) References Cited

U.S. PATENT DOCUMENTS

| | | | | |
|---|---|---|---|---|
| 6,285,346 | B1 * | 9/2001 | Melnik et al. | 345/87 |
| 2002/0080127 | A1 * | 6/2002 | Park et al. | 345/204 |
| 2002/0101169 | A1 * | 8/2002 | Boer | 315/169.3 |
| 2002/0149576 | A1 * | 10/2002 | Tanaka et al. | 345/204 |
| 2003/0034946 | A1 * | 2/2003 | Liang et al. | 345/89 |
| 2005/0007389 | A1 * | 1/2005 | Kumamoto et al. | 345/690 |
| 2007/0132712 | A1 * | 6/2007 | Song | 345/102 |
| 2007/0176883 | A1 * | 8/2007 | Hsu et al. | 345/102 |
| 2007/0182701 | A1 * | 8/2007 | Kim et al. | 345/102 |
| 2008/0100645 | A1 * | 5/2008 | Nitta | 345/690 |
| 2008/0170054 | A1 * | 7/2008 | Chou | 345/205 |

* cited by examiner

*Primary Examiner* — Quan-Zhen Wang

*Assistant Examiner* — Tony Davis

(57) ABSTRACT

Array of light emitting device is provided as the backlight for a display apparatus. A control circuit and drive method are provided utilizing a multiple scan selection drive scheme and a charging-relaxation step to eliminate the flicker and to enhanced the speed of LC response.

25 Claims, 14 Drawing Sheets

| Input | | | | Output | | | |
|---|---|---|---|---|---|---|---|
| ClrBAR | Clock | A | B | QA | QB | ... | QH |
| L | X | X | X | L | L | | L |
| H | H | X | X | L | QAn | | QGn |
| H | ↑ | H | H | H | QAn | | QGn |
| H | ↑ | L | X | L | QAn | | QGn |
| H | ↑ | X | L | L | QAn | | QGn |

Figure 11 (Prior Art)

| Input | | | | | Output | | | |
|---|---|---|---|---|---|---|---|---|
| ClrBAR | Act All | Clock | A | B | QA | QB | ... | QH |
| L | L | X | X | X | L | L | | L |
| H | L | ↑ | X | X | L | QAn | | QGn |
| H | L | ↑ | H | H | H | QAn | | QGn |
| H | L | ↑ | L | X | L | QAn | | QGn |
| H | L | ↑ | X | L | L | QAn | | QGn |
| X | H | X | X | X | H | H | H | H |

Figure 12

STRUCTURE OF LIGHT EMITTING DEVICE ARRAY AND DRIVE METHOD FOR DISPLAY LIGHT SOURCE

CROSS REFERENCE TO RELATED APPLICATIONS

The present application claims priority of U.S. Provisional Patent Application No. 61/176,887, filed on May 9, 2009, which is hereby incorporated by reference.

BACKGROUND OF THE INVENTION

1. Field of the Invention

The present invention relates to an image display apparatus and a drive method to operate the display apparatus. The display apparatus comprises a light source and a light modulator that modulates the light from the light source to produce images. The display apparatus further comprises a control means for operating the light source and the light modulator. The control means operates the light source and the light modulator in coordination, and in such a manner that enhances the response time of the light modulator. Furthermore, the light source comprises light emitting elements with response time substantially faster than the relaxation time of the light modulator, and is operated in such a manner that eliminates the adverse effects from switching the light modulator.

2. Description of the Prior Art

A liquid crystal (LC) cell is a light valve that modulates light directed thereto. A liquid crystal display (LCD) produces images by modulating light with a plurality of spatially distributed LC cells. The LC cells in a display are set to various states according to the spatially distributed color and brightness of the image, and varying in time in motion pictures. The capability of showing motion pictures of such display device is influenced by the speed of the LC cell responding to the change of setting of state when the image changes. Accordingly, the response time, which characterizes the speed of an LC cell responding to a change of setting, is a speed limitation of the LC cells in displaying dynamic images.

In displaying motion pictures, the cell setting is updated at a rate at least the refreshing rate of the picture images. In addition, in different applications such as color sequential drive scheme, an LC response time much higher than the image refreshing rate is needed. Accordingly, a response of the LC cell slower than the rate of the changing images results in various types of distortion and artifacts in images, such as color breakup, trailing of a moving object, flicker and etc.

Furthermore, the current LC display relies on the color filters to produce color images. Each color filter inhibits the transmission of the other colors. Consequently, in a color display where display cells are structured with three primary colors, the efficiency of light utilization due to the color filter alone drops to below 30%. An alternative is to structure the display without color filters and operate the display by sequentially displaying the color image components corresponding to different colors in time, thereby producing a time-integrated replication of the input color images. In the conventional practice of such color-sequential drive scheme, the LC cells are operated at a speed three times faster than that of LC cells operated with three color filters are used. Typical liquid crystal cell structures used in consumer direct-view displays have a cell gap near 5 micrometers and an intrinsic response time above 8 milliseconds; the response time is much longer when the action is directed toward a relaxation.

Such response time is not sufficient for operating an acceptable time-integration of color sequenced images which requires a response time on the order of 1 ms or faster. Consequently, sequencing three colors in time is not yet a viable solution to improve the light and power efficiency in such applications. Other proposed schemes such as using two-color sequence also result in images compromising in quality or suffering inherent color deficiency at various situations and picture types.

The present invention provides an apparatus and method to improve or eliminate the aforementioned artifacts and distortion, and to provide a method to operate the LC cells at a faster intrinsic response time. Accordingly, direct viewing LC display may be constructed and operated without color filter, and at an improved efficiency.

As the response is generally slower from a charged state to a relaxed state than in the opposite direction in many light valves, such as LC cells and MEMS, the present invention is directed to the application to the light valves in general, with LC cell as a preferred embodiment for the purpose of illustration in this specification.

SUMMARY OF THE INVENTION

The present invention provides a display apparatus comprising a light source and a plurality of light valves, wherein the response time of the light source is faster than the response of the light valves. A preferred embodiment of such light source is a plurality of light emitting diodes (LED) A preferred embodiment of the light valves is an array of liquid crystal (LC) cells. The light source may comprise multiple lighting elements wherein each lighting element may be switched independently. The light source may also be constructed in a way that the lighting elements are arranged in groups, where all elements in one group is switched on and off together. The display device displays images according to input image signals. The present invention further comprises a control device controlling the output light intensity of the light source and the transmission of the LC cells in synchronism.

In a preferred embodiment, the LC cells are constructed in an orientation that the relaxed state corresponds to the bright state that allows the highest degree of transmission of light to the viewing side. Such preferred embodiment is the prevailing construction of liquid crystal display cells.

The present invention provides a display apparatus with LC cells operated in a manner that a section of LC cells of the display is first set to a charged and subsequently set to a relaxed state, thereafter each row of the LC cells are set sequentially to the state to replicate the image according to input image. In an operation of setting a LC cell to the relaxed state, a control signal enabling the writing of data is applied to a group of LC cells for receiving the input data; such enabling operation may be performed by applying a select signal to the scan electrode connected to the cells thereby turning on a transistor in a pixel circuit that connects to the data electrode. During the time the cell is enabled, all data electrodes are set to a level corresponding to a relaxed state, thereby applying the signal corresponding to the relaxed state to all the selected cells. In an example of the embodiment, the group of LC cells corresponds to a row of LC cells. In an alternative embodiment, said group of LC cells comprise a section of rows of LC cells. In yet another alternative embodiment, said group of LC cells comprises the entire cells of the display.

In coordination with setting the LC cells to the relaxed state, the light source illuminating such cells is operated in synchronous with the dynamic change of state of the cells so that the illumination is extinguished (dark) as the cells approaching the relaxed state. The duration of this light-extinguishing period is a fraction of a frame time, the time for refreshing (updating data for) a full image frame. The operation time for applying the control signals for setting the cells to the relaxed state is approximately the same as that of addressing image data to a single display line. A preferred embodiment is to group the display lines in such a manner that all lines in a group are set to the relaxed state simultaneously. Accordingly, the added operation time for setting to the relaxed state is less than a small fraction of a frame time As the illumination is turned off for the cells being set to the relaxed state, the change of state of the LC cells that deviates from the image is not visible and does not produce any disturbing artifact. Accordingly, a longer time may be allowed for the cell to approach and settle to the relaxed state without introducing adverse effect to image quality.

The present invention further provides an apparatus comprising LC cells and LED elements, and an operation method thereof to set the LC cells to replicate the input image after setting the LC cells to the relaxed state. The LED light source is then turned on to provide distributed illumination as defined by the input image signal.

The present invention provides a display apparatus comprising LC cells and an operation method thereof wherein setting the LC cells is primarily in the direction toward a more charged state. Accordingly, the response time of the LC cells is improved. Furthermore, since the illumination light source is extinguished when the LC cells are set to relaxed states, the undesirable leak of light during the transition of cell switching is eliminated, thereby improving the contrast ratio and eliminating flicker.

BRIEF DESCRIPTION OF THE DRAWING

FIG. 11 is a illustration of the prior art.

FIG. 12 is a preferred embodiment of the present invention.

DETAILED DESCRIPTION OF THE INVENTION

Figure 1A:
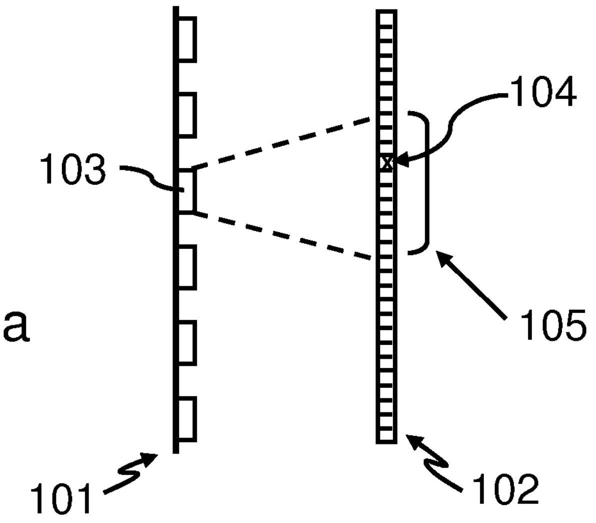
FIGS. 1*a*, 1*b*, 1*c* and 1*d* are schematic diagrams of a preferred embodiment of the present invention.

In this description, a light modulator is a device that modulates the light output from a light input, according to a control signal. A light modulator may be a single cell or comprises a plurality of cells, wherein each said cell operates to modulate the light directed thereto according to a control signal. Preferred embodiments of a light modulator include passive and active liquid crystal display array, and MEMS array. The liquid crystal display (LCD) array is the preferred embodiment hereinafter for the purpose of illustration.

A light valve is a single device that modulates the light directed thereto according to a control signal. Preferred embodiments of a light valve include passive and active liquid crystal cell, and a MEMS cell. For the purpose of illustration, the liquid crystal (LC) cell is used as the preferred embodiment of a light valve in this specification.

A control signal, typically an applied voltage, causes a light valve to change from its current state to a final state. The response time is the measure of time for the light valve to substantially complete such change of state in response to an applied voltage. For example, in a common practice, the time for completing 90 percent of the transition of such change of state is considered as the response time.

A light valve responds to a control signal by conforming to the control voltage applied to the light valve. This is typically an energizing or a relaxation process. For example, in a light valve of LC cell, an applied voltage higher in magnitude than the existing voltage causes charging (energizing) to the LC cell; conversely, a lower voltage causes relaxation (discharging) of the LC cell. A charging or energizing process causes the light valve to conform to a stronger electrical field induced by the higher voltage, and a relaxation process allows the light valve to re-arrange more according to its internal forces. In a fully relaxed state where the applied voltage is zero, a light valve is aligned according to its internal structure and forces. Furthermore, the response of such light valves is typically substantially slower in relaxation than in energizing. For example, a liquid crystal (LC) cell responds to a voltage that sets the cell to a charge neutral state (relaxed state) in about 10 to 25 millisecond; same LC cell responds to a voltage that energizes (or charges) the cell in about 5 milliseconds or less.

The present invention provides an apparatus comprising a light source; a plurality of light valves modulating light output from said light source; a data electrode for applying data voltages to said light valves; a control circuit performing recurring operations on said light emitting elements and said light valves; said operations comprising: 1) setting a light emitting element to off or a dimming state; 2) setting a light valve illuminated by said light emitting element to a relaxed state; wherein in an operation cycle, said operation 1) precedes or overlaps said operation 2) A dimming state of a light source corresponds to a light source setting where the light output is nearly the minimum of the dynamic range of the light output in an operation. For example, a setting to turn an LED off may set the LED to the lowest light level of its operation range where the light output is nearly, but not completely, extinguished. A dimming state in such example represents a setting near the lowest lighting level of the LED.

A preferred embodiment of the control means is a control circuit comprising a programmed integrated circuit (IC) or a plurality of integrated circuit elements. The program comprises executable instructions to perform the operations provided in this invention. Such control circuit is typically assembled on a printed circuit board.

The present invention further provides a drive method to operate a display apparatus comprising a light source and a plurality of light valves modulating light output from said light source in a manner that the before addressing or refreshing the light valves with new image data, the light source is set to a dimming state and the light valves are set to a discharged state. The present invention further provides a circuit for the control circuit to perform the said operation above.

A light valve operates to control the amount of light delivered from the source to the viewer. In the example of a liquid crystal (LC) light valve in an active matrix liquid crystal display (LCD), a control voltage is applied to two electrodes of an LC cell, wherein one electrode is a common electrode and the other is connected to a data electrode via a thin-film transistor (TFT), where the TFT is operated by the scan electrode and the scan driver connected thereto. A light source (backlight) is arranged on the backside of the LC cell, and the LC cell is controlled by an applied voltage to modulate the light transmission from the back to the front (the viewing side).

Accordingly, in operating a liquid crystal (LC) cell, a voltage is applied to the LC cell, thereby setting the LC cell to a state between the fully relaxed state and the fully charged state according to the applied voltage. A higher applied voltage in magnitude causes a higher electrical field and greater degree of preferential alignment of the LC along the electrical field. The amount of light delivered through an LC cell is affected by the degree of preferential alignment of the LC cell, and by the orientation of the optical components such as polarizer.

A preferred embodiment of the LCD display is structured so that the relaxed state of the LCD cells corresponds to a bright state. In a relaxed state, the electrical field between the two electrodes is nearly zero, and the LC is aligned to the surfaces according to the molecular forces and the surface structures. A preferred embodiment is structured so that the directions of LC alignment at the light entering surface (i.e., the back side of the LC cell) and at the light exiting surface (the front side of the LC cell) are different by an angle; the orientations of the polarizer at the entering surface and the orientation of the polarizer at the existing surface are different by a similar angle. Accordingly, the highest amount of light passes from the back side to the viewing side when LC is in the relaxed state. Furthermore, the transition of the LC material from a relaxed state to a charged (i.e., energized) state is substantially faster than the transition in the opposite direction. In such typical embodiment, a relaxed state of LC cell corresponds to the bright state. The description herein illustrates the present invention using such embodiment.

A preferred embodiment of the present invention uses a light source that switches in a fractional time of that of switching the LC cells. An example of such preferred embodiment is using LED as the light source and LCD cells as the light valves. The LED response time (T2) is in the order of 200 micro seconds, and the typical LC response time (T1) is a few milliseconds. For the LC response time, the relaxation time (Tr), i.e. going from a charged state to the relaxed state, is typically longer than the charging time Tc (i.e., the response time from a relaxed LC state to aligning the LC structure to an applied electrical field.)

Preferred embodiments of the present invention are herein described using light emitting diodes (LED) as light source, and liquid crystal display (LCD) cells as illustration. Examples of constructing a display apparatus comprising array of LCD cells and LED light source are found in U.S. Pat. No. 5,408,109, and examples of using organic light emitting diode to form active matrix display devices are found in U.S. Pat. No. 5,684,365 and U.S. Pat. No. 6,157,356, all of which are hereby incorporated by reference.

In this description, the recurring operations may comprise similar operations performed at equal time intervals (i.e., cyclically), as well as at varying time intervals.

FIG. 1*a* provides a schematic drawing of the side view construction of a preferred embodiment of the LEDs and LCD array in the apparatus of the present invention, wherein 101 is an assembly of the LED light source, 103 is an LED lighting element, 102 is an array of LCD cells, and 105 represents an area of LCD cells illuminated by LED lighting element 103, wherein 104 represents a single LCD cells within the area 105. In the 2-dimensional array view, 103 expands to a group or a row of LED elements, and 104 expands to a group (row) of LCD cells controlled by the a scan terminal. The 3-dimensional illustration is provided in FIG. 1*c* where 120 is the LCD array, and 121 Is the LED light source illuminating the LCD array.

It is construed that the above structural illustration does not limit the scope of the present invention. For example, a single control circuit IC may comprise multiple control programs to control both rows and columns, or comprises both LED control programs and the image processing of data for LCD control. Furthermore examples of variations include but not limited to: the arrangement of LCD cell elements being arranged in a non-orthogonal arrangement; the LED elements being arranged with multiple colors or comprising multiple LEDs in one unit; the LED elements being arranged on one side of the display and illuminates on the LCD cells via a light guide.

Figure 1B:
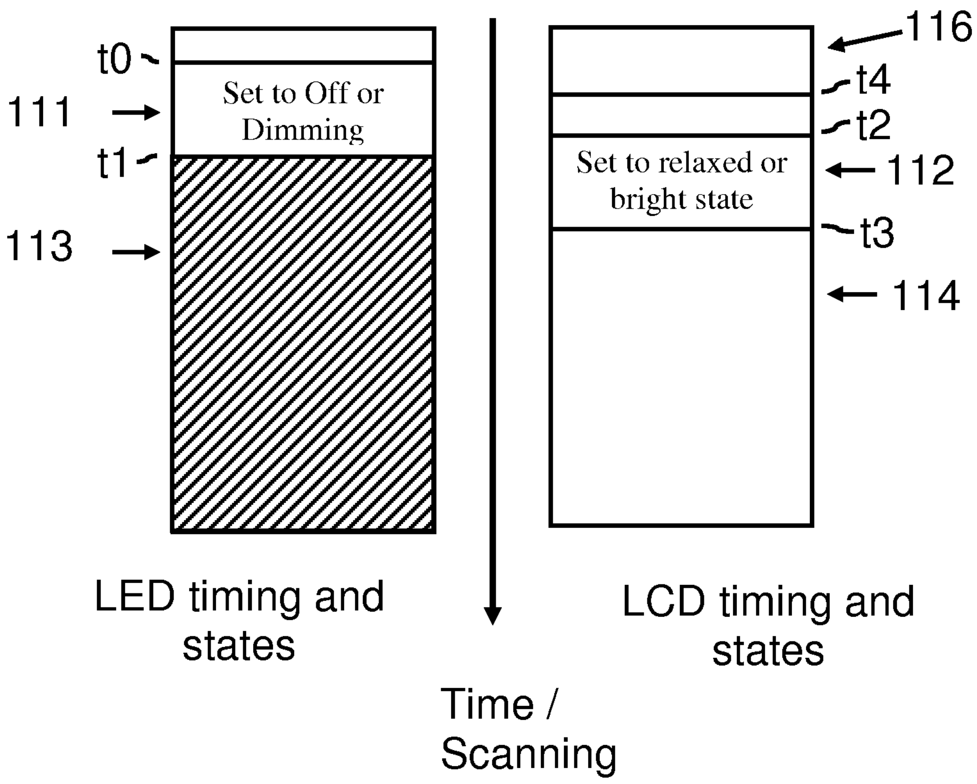
Figure 1C:
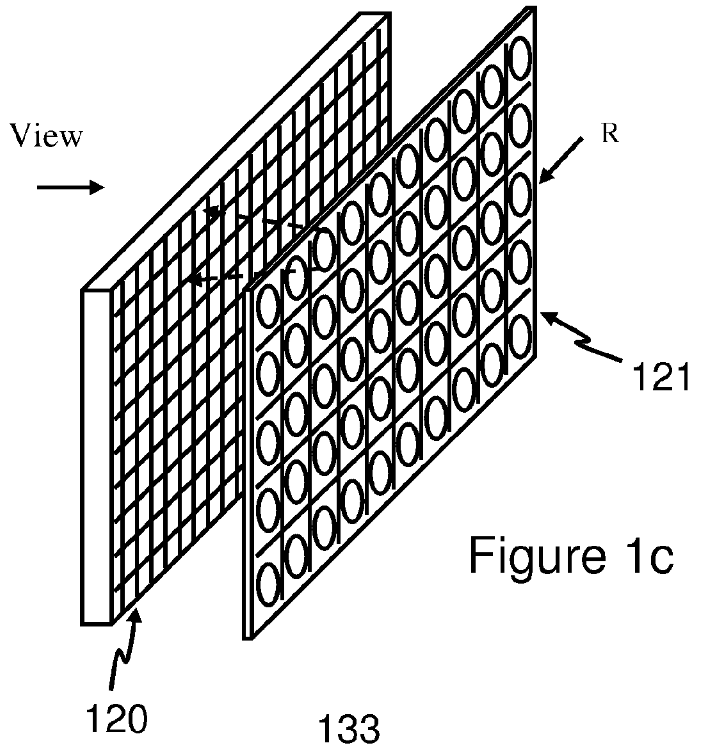
Figure 1D:
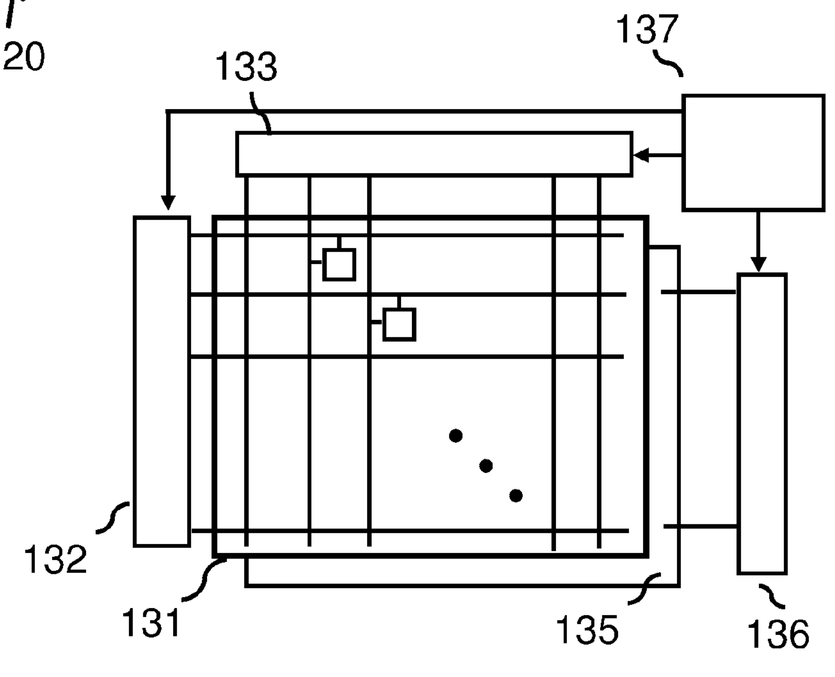

FIG. 1*d* provides a schematic drawing of the circuit diagram of a preferred embodiment of present invention, wherein the scan driver circuits 132 provides multiple scanning signals for the selection of cells in the LCD array 131 to receive data, the data driver 133 delivers image data to LCD array 131, LED driver circuit 136 provides drive current to the LED light source 135, and the control circuit 137 operates to process image data and provide synchronized control signals to the LCD and LED drivers. In one preferred embodiment, the LED driver 136 is constructed to have drivers distributed in the LED array wherein each driver output control a LED or a set of LED in series. Register or memory may also be integrated in the driver to maintain a drive current for a prolonged period of time. In another preferred embodiment, the LED driver 136 is constructed in rows and columns, to address the LED array with drive signals, wherein, each element of LED array is connected to a local driver circuit that responds to the drive signal and sets the LED driver current. In response to the control signals generated by the controller 137, the LED driver 136 increases or decrease drive current to the LED, thereby increasing or decreasing the light output of the LED lighting elements. In response to the controller signals for the LCD array, the LCD driver 132 selects the LCD cells to receive the data input, thereby increasing or decreasing the light transmission of the selected LCD cells according to the data signals.

A preferred scan driver 132 comprises a plurality of outputs. The cells of LCD array 131 are arranged in scan groups wherein all cells in one scan group are connected to the same output terminal of the scan driver 132, and are selected simultaneously to receive the data. A preferred scan group is a row of cells in the array. Without limiting the generality of a scan group, in the following description, a row indicates a scan group that is connected to the full set of data driver outputs. Therefore, different rows of cells must be selected at different time for receiving different image data of their own. For this reason, a scan (or row) driver used in a conventional LCD display operates to select one scan group (or one row) at a time, and operates sequentially.

In a preferred embodiment of the present invention, the driver circuit 132 further incorporates a function that operates to select a plurality of rows of the LCD cell array simultaneously by a control signal. The driver circuit 132 in another embodiment of the present invention further incorporates a function that operates to select all rows of the LCD cell array simultaneously. In yet another preferred embodiment of the present invention, the scan driver incorporates a function to set all the selected rows of cells simultaneously to a state that corresponds to a relaxed state of the LC cell. The driver circuit 132 may be a single integrate circuit (IC) that has sufficient output terminals to connect to and control the LCD rows as described, or an assembly of multiple driver ICs each one having the full function as described above and operating on the LCD lines connected to its output terminals independently according to its control signal.

Accordingly, the LED (135)-LCD (131) system is operated with a synchronized timing control by the control circuit 137. FIG. 1*b* provides a timing diagram of a preferred embodiment of the synchronized drive of LED and LCD. The time axis indicates the direction of the time. The LED timing and states on the left of the time axis gives the control circuit timing for LED drive and the state of LED 103 in response to the control voltage. The LCD timing and states on the right of the timing axis gives the control circuit timing of LCD drive voltage and the response of the LCD cells in area 105 illuminated by LED 103.

FIG. 1*b* provides a preferred embodiment of a synchronized timing operation sequence of 116-111-112. According to this sequence, in the period 111 between t0 and t1, the control circuit applies a control signal to the LED driver that sets the drive current of LED 103 to zero or a low-level floor current which corresponds to an off or a dimming state of LED. A preferred embodiment of the LED driver comprises an internal memory so that the LED remains in the off or dimming state in region 113 after t1 until the next LED setting signal arrives.

In another preferred embodiment, a device comprising a control means performing recurring operations of:

1) applying a control signal that decreases a current source, or sets a current source to off;

2) applying a control signal that sets a plurality of voltage sources to a charging voltage;

3) applying a control signal that sets a plurality of voltage sources to zero or near zero;

wherein in an operation cycle said operation step 1) precedes or overlaps operation step 3);

wherein said current source supplies current to a light emitting element, and wherein said voltage sources supply voltage signals to a plurality of light valves;

wherein said control means operates to maintain coordination between the three operations according to a timing sequence;

In a preferred embodiment, the above said timing sequence operates said three operations within 30 milliseconds in one recurring operation cycle.

As described in paragraph 45, the decreasing current in the light emitting element gives decreasing (lower) light intensity of the light emitting element.

At or prior to the time t4, in the period 116, the control circuit applies a signal for setting the LCD cell to a fully charged or overcharged state. Such a fully charged or overcharged state corresponds a condition that the applied voltage is sufficiently high so that the induced electrical field in the LC cell field causes the LC molecules in the cell to mostly align in the direction of the electrical field. The signal applied at time t4 may be a signal corresponding to the highest voltage for setting an image data, or above (over) the highest voltage for the image. In the preferred embodiment where the LCD cells are constructed so that the full relaxed state corresponds to the bright state, the signal applied at t4 corresponds to the dark voltage setting the LC cells to the fully dark state. In such embodiment, the control signal applied at t4 is the dark voltage (i.e., a fully charged state) or above the dark voltage (i.e., overcharged state) A preferred embodiment for the time t4 is at the same time as t0, or leading t0 or lagging t0 by a fraction of the response time of the LC in response to the dark or overcharged voltage applied at t4.

In the time period 112 between t2 and t3, the control circuit and the LC driver circuits applying the setting signals to set the LC cell drive voltage to zero which corresponds to a discharged or relaxed LC state. A preferred method for setting the area 105 LC cells to the relaxed voltage is to activate all the scan outputs that select the lines corresponding to area 105, and simultaneously provide data voltage that sets LC cell voltage to zero. Another preferred method of setting the group 105 cells to relaxed state is to reverse the scan driver output voltage on the lines corresponding to area 105 so that the LC cells in said area are set to a voltage outside the dynamic range, and simultaneously set the voltage on the counter electrode of the LC cells similarly to neutralize the LC cell voltage. In the subsequent time period 114, the LC approaches a relaxed state in response to the setting voltage.

In a preferred embodiment, the control circuit operates to set the LED drive current by sending a select signal to select the driver of LED 103 and simultaneously sending the LED data which set the LED driver output to zero or a low level current. The control circuit operates to set the drive voltage of LCD cells in area 105, which includes LCD cell 104, by sending a select signal that selects the LCD cells in area 105 to receive image data and simultaneously address the LCD cells with the data signal that corresponds to the discharge or relaxed LC state. In this embodiment, all cells in the group in area 105 are turned to a discharged state in one selection. In a preferred timing sequence, time t2 is after t1; in another preferred embodiment, t2 is between t0 and t1. Given the overlap of period 111 and 112, applying the setting signal of the LC cell in the period of 112 thus may precede, at the same time as, or trail the application of the LED setting signal in the period of 111. For displaying dynamic images where the image data changes with time, the method of operation of setting LED and setting LCD described here repeats; such operation precedes the data addressing period during which the new image data is written to the LC cells in an image refreshing cycle.

Since the response time of LC is substantially longer than that of LED, the decrease of LED light output in response to the setting is substantially faster than the response of LC cells to reach the relaxed state. The signal of setting the corresponding LED to off or dimming state may be applied before applying the signal to set the LC cells to relaxed state, and still having the LED turned off before the LC cell substantially changes its optical state. Accordingly, the LED setting signal may precedes the LC setting signal a small fraction of the response time of the LC cell without creating an appreciable negative effect. Therefore, the operation of setting LED to off or a dimming state described above may be performed after the operation of setting the LC cells to relaxed state. Thus in another preferred embodiment, the setting of LED element to off or dim state overlaps the operation of setting the LC cells to the relaxed state. Therefore the operation of setting LED may precede or overlap the operation of setting the LC cells to the relaxed state. Therefore, as a preferred timing, time t2 in FIG. 1*b* may be substantially close to t0, or slightly before t0 by a small fraction of the response time.

According to the description herein above, a preferred embodiment of present invention therefore provides an image display apparatus comprising a light source that comprises a plurality of light emitting elements; a plurality of liquid crystal (LC) cells modulating light output from said plurality of light emitting elements; a data electrode for applying data voltages to said LC cells; a control circuit performing recurring operations on said light emitting elements and said LC cells; said operations comprising: 1) applying a control signal for setting a subset of light emitting elements to off or a dimming state; 2) applying a control signal for setting an LC cell illuminated by said subset of light emitting elements to a relaxed state; wherein in an image refreshing operation cycle, said off or dimming state occurs before said light valve substantially changes its optical state in response to operation 2), and wherein said subset comprises one or more of said light emitting elements.

The light valve has a response time T1 which is the time needed for the light valve to change substantially to conform to the applied voltage. Accordingly, in a small fraction of T1, the light valve has not changed its optical state substantially. Accordingly, an alternative preferred embodiment operates according to the sequences of:

(a) said operation 2) precedes said operation 1) by a small fraction of T1; or (b) said action 1) precedes said action 2); or (c) said action 1) overlaps action 2).

Here the response time T1 corresponds to the action of the LC cell; it is the relaxation time when the action is setting the LC cell to the relaxed state, and is the charging time when the action is to apply an electrical field from an relaxed state.

After a sequence of operation 116-111-112 operating on an LED 103 and an area 105 illuminated by the LED 103, setting the LED 103 to off or dimming state and setting LC cells in 105 illuminated by LED 103 to the discharged or relaxed state, the LC cells in region 105 remain in the relaxed state for a period that is a fraction of the period of one refreshing cycle.

Figure 2A:
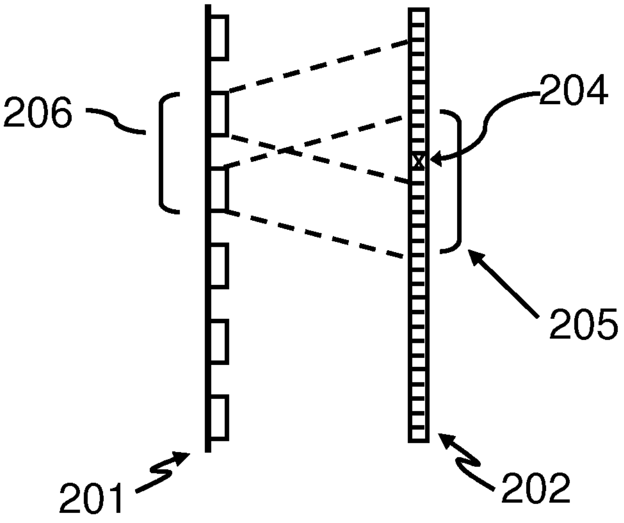
FIGS. 2*a* and 2*b* are schematic diagrams of a preferred embodiment of the present invention.
Figure 2B:
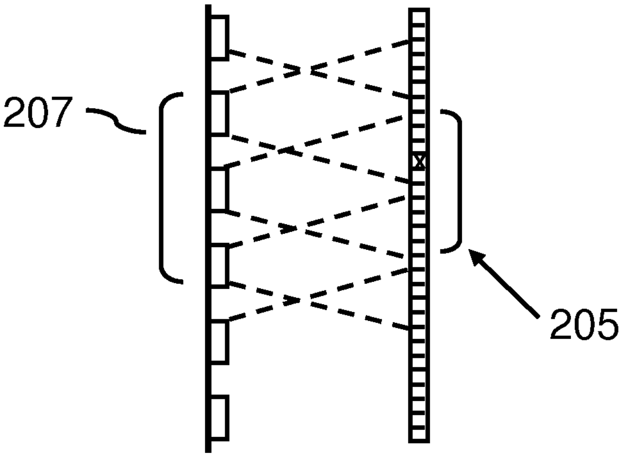

A preferred embodiment of operation sequence 116-111-112 is to operate said sequence of operations section by section. As illustrated in FIG. 2, an LC cell in region 205 is illuminated by LED elements from more than one group of LED, where LC cell 204 is illuminated by multiple elements in LED group 206. In the present invention, setting an LC cell 204 in area 205 to the relaxed state is preceded by setting the cell 204 to a charged or over-charged state. In a preferred embodiment, setting the LC cell 204 in area 205 to the relaxed state is preceded by setting all the LED elements that illuminate on LC 204, i.e. all LED elements in area 206, to off or dimming state. Furthermore, in another preferred embodiment, setting a group of LC cells to the relaxed state, all LED lighting elements illuminating on any cells in the group are set to off or a dimming state. As illustrated in FIG. 2*b*, area 207 comprising the LED lighting elements that illuminate on LC cells in area 205. In this preferred embodiment, setting the section 205 LC cells to the relaxed state is preceded by setting all LED elements in area 207 to off or dimming state.

Figure 3A:
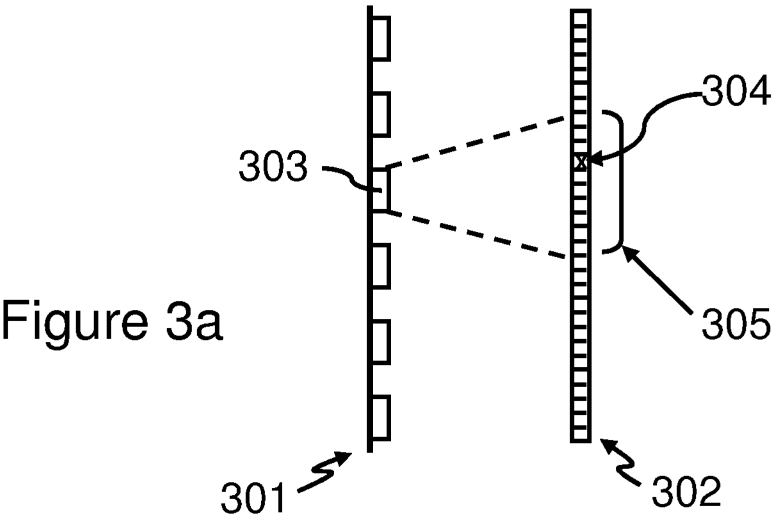
FIGS. 3*a* and 3*b* are schematic diagrams of a preferred embodiment of the present invention.
Figure 3B:
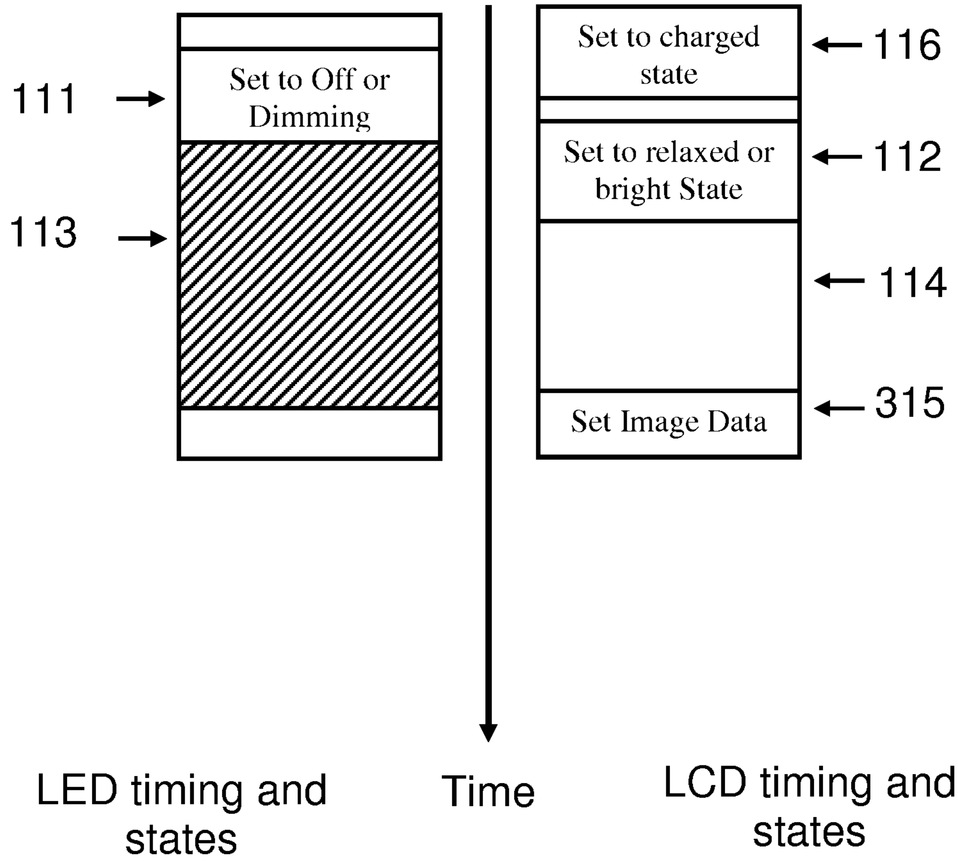

FIG. 3 provides another preferred embodiment wherein a control circuit performs operation sequence of 116-111-112 in the period 116 to apply an LC cell setting voltage to charge or over-charge the LC cell 304; in the period 111 to apply an LED setting signal to the LED driver that sets the drive current of LED 303 to low which corresponds to an off or a dimming state of LED; in the time period 112 to apply an LC setting voltage to set the LC drive voltage to low or zero which corresponds to a discharged or relaxed LC state; and in the subsequent time period 114, the LC approaches a relaxed state in response to the setting voltage. The LED elements 303 remain in the off or dim state after the setting period 111 for a controlled period of time 113, typically a fraction of the refreshing cycle. A preferred method for setting the LC cells in area 305 to the relaxed voltage is to activate all the scan outputs that select the line corresponding to area 305, and simultaneously provide data voltage that sets LC cell voltage to zero.

In a preferred embodiment, following period 314, the control circuit delivers the scan signal to the scan driver and image data to the data driver in period 315, sequentially selecting the rows of cells in area 305, and addressing the corresponding image data for the cells selected. Therefore, in this preferred embodiment, the present invention comprises a third operation 3) setting said LC cell to a state according to input image data to produce image; wherein in an image refreshing operation cycle, operation 2) precedes operation 3).

Figure 4A:
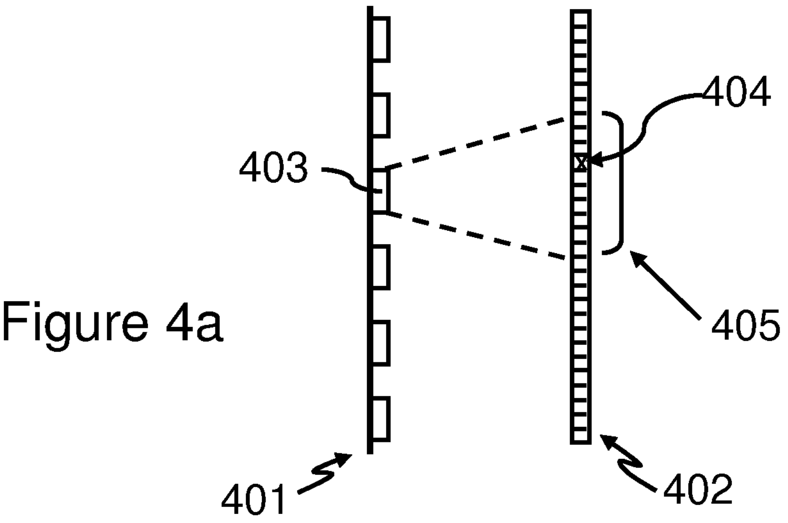
FIGS. 4*a* and 4*b* are schematic diagrams of a preferred embodiment of the present invention.
Figure 4B:
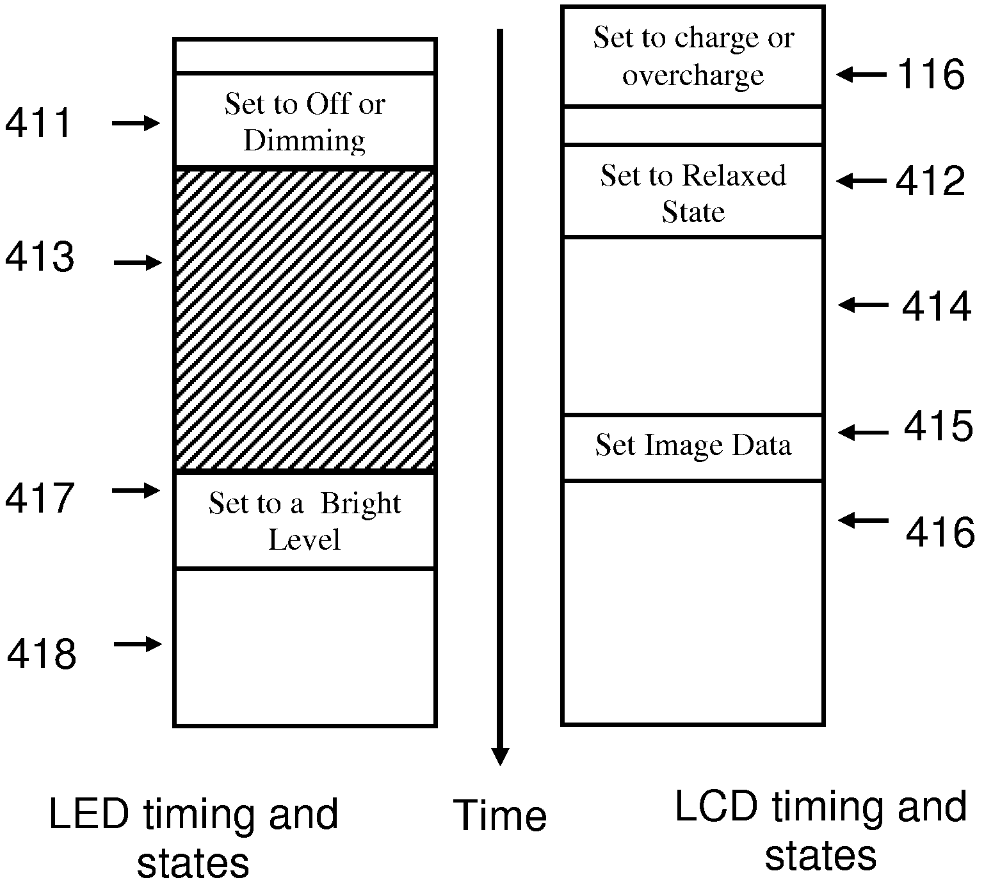

FIG. 4 provides another preferred embodiment of the present invention wherein the control circuit operations comprise the operations of FIG. 3. The operations comprise: applying a control signal in the period 116 to charge or over-charge the LC cell 404; applying a control signal in period 411 to the LED driver that sets the drive current of LED 403 to low which corresponds to an off or a dimming state of LED; applying a control signal in the period 412 to the LC drive circuits to set the LC drive voltage to low or zero which corresponds to a discharged or relaxed LC state for 404. The LED element 403 remains in the off or dimming state in the period 413 subsequent to 411, and in the period 414 subsequent to 412, the LC approaches a relaxed state in response to the setting voltage. Subsequent to 414, the control circuit delivers the scan signal to the scan driver and image data to the data driver in period 415, sequentially selecting the rows of cells in area 405, and addressing the corresponding image data for the cells selected.

Subsequent to period 413, the control circuit further performs an operation to set said light emitting element that has been set to off or a dimming state in said operation 1) to a bright state. Since the response of the LC is slower than the response of LED, in a preferred embodiment, the setting of the LED elements to the bright state is performed either after or overlaps the setting of LCD cells in an operation cycle. Wherein the LED elements remains in the bright state for period in section 418, and wherein the LCD cells approach their respective state representing respective image point in the period 416 after the setting period 415.

Therefore, a preferred embodiment of the present invention includes a display apparatus described in FIG. 3 above, further comprising a forth operation: 4) setting said light emitting element that has been set to off or a dimming state in the prior operation 1) to a bright state; wherein in an operation cycle, operation 3) precedes or overlaps 4).

In another preferred embodiment of the present invention, the operation 4) above sets the light emitting element that has been set to off or dimming state in said operation 1) to a brightness level according to a scaling relation. In a preferred embodiment, such scaling relation directs to a brightness level setting that, in at least part of the gray scale range of the image, increases or decreases according to the average brightness in an area surrounding said light valve illuminated by said light emitting element. Accordingly, the brightness level setting increases with increasing average brightness in an area surrounding said light valve. For example, the gray scale range from full dark to full bright is represented by 0 to 255. The scaling relation above directs to a brightness level setting that increases with increasing average brightness of the image in said area in the range from gray level 100 to 200. In another preferred embodiment, such scaling relation relates to the maximum brightness in said area instead of the average brightness. In another preferred embodiment, operation 3) precedes operation 4).

Figure 5A:
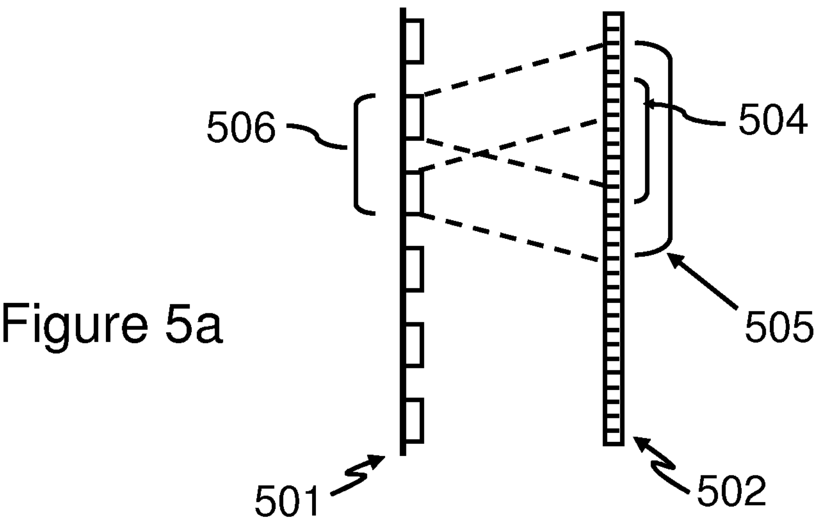
FIGS. 5*a* and 5*b* are schematic diagrams of a preferred embodiment of the present invention.
Figure 5B:
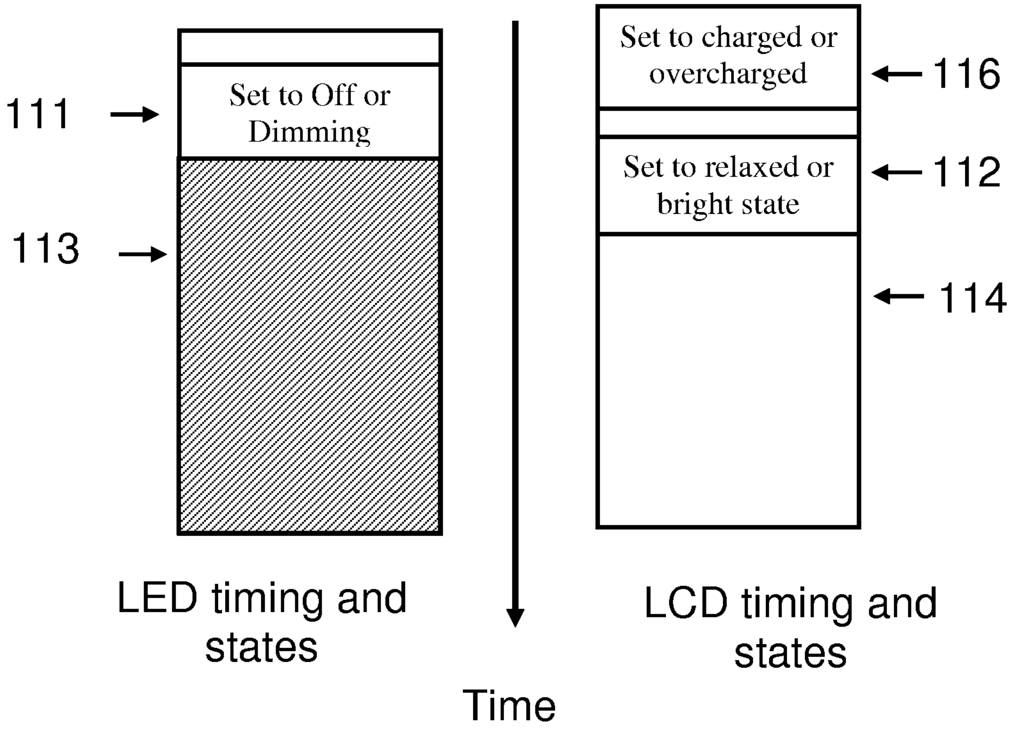

FIG. 5 illustrates further detail for a preferred embodiment wherein more than one LED light element illuminate one group of cells it setting to the relaxed state, and a LC cell is illuminated by more than one LED source that turn on and off at different times. Area LC cells in area 505 are illuminated by the LED elements in area 506. In the area 504, the LC cells are illuminated by both elements in area 506. After completion of addressing image data to the trailing edge of area 504, the first LED element in area 506 is turned on. At this time, only partial illumination to the cells in area 504 is provided since second (lower) LED element in area 506 remains off. To compensate the partial illumination for part of the time, the intensity of the light is adjusted to offset the reduction in light due to the partial illumination. The adjustment is to increase the intensity by an amount equivalent to the loss of light during the time the second LED element remains off. The sequence of operation for an individual LC cell and for an individual LED element is similar to that of the previous embodiments of FIG. 3.

Figure 6A:
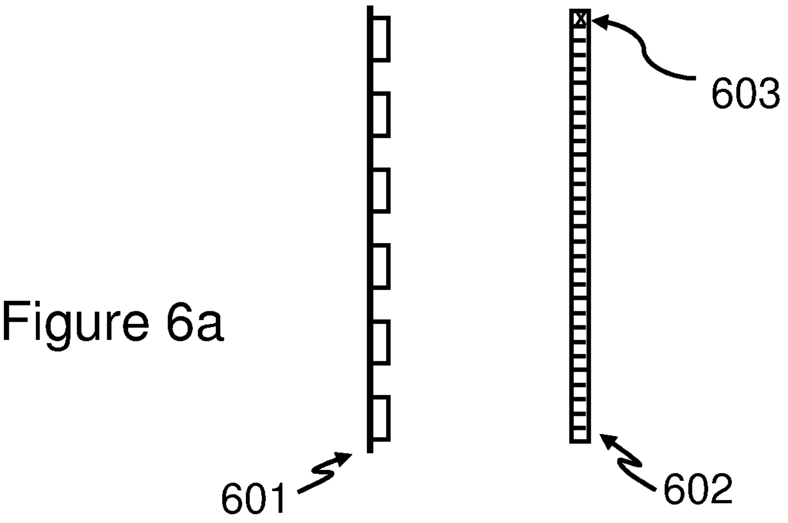
FIGS. 6*a* and 6*b* are schematic diagrams of a preferred embodiment of the present invention.
Figure 6B:
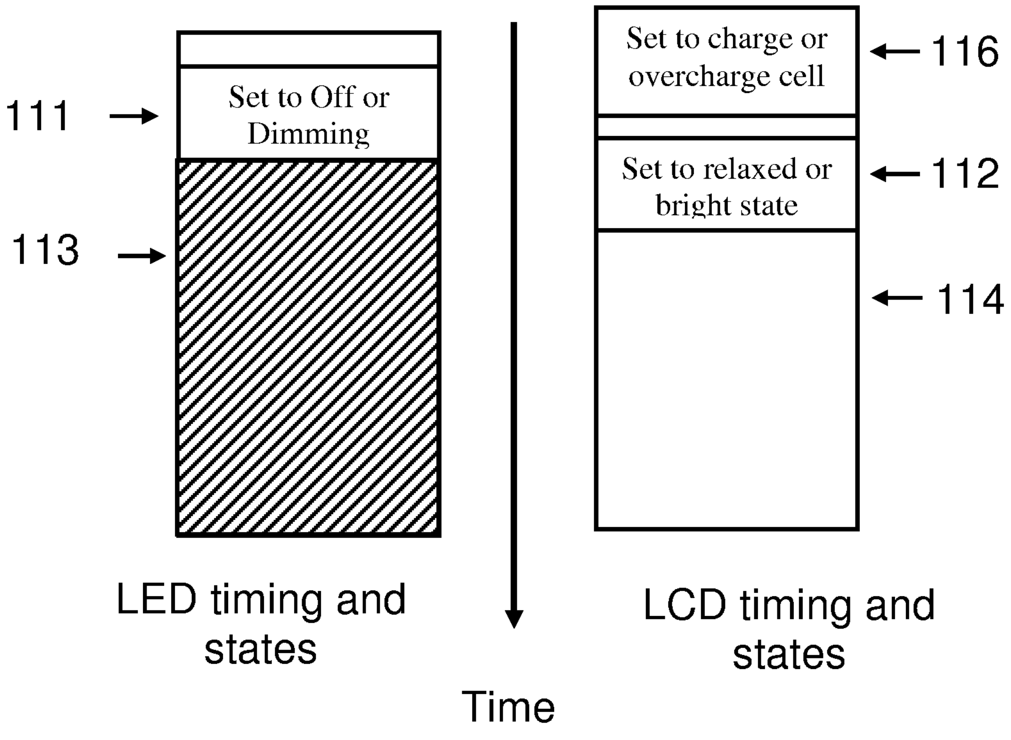

Another preferred operation (FIG. 6) of the present invention comprises control circuit and a drive method in which all the LED light elements are turned off, and then the LC cells are set to the relaxed state. The image data are then addressed to the LC cells sequentially. As the image data addressing proceeds, the LED elements are turned on sequentially for each section of the LC cells where the image data addressing is complete.

Figure 7:
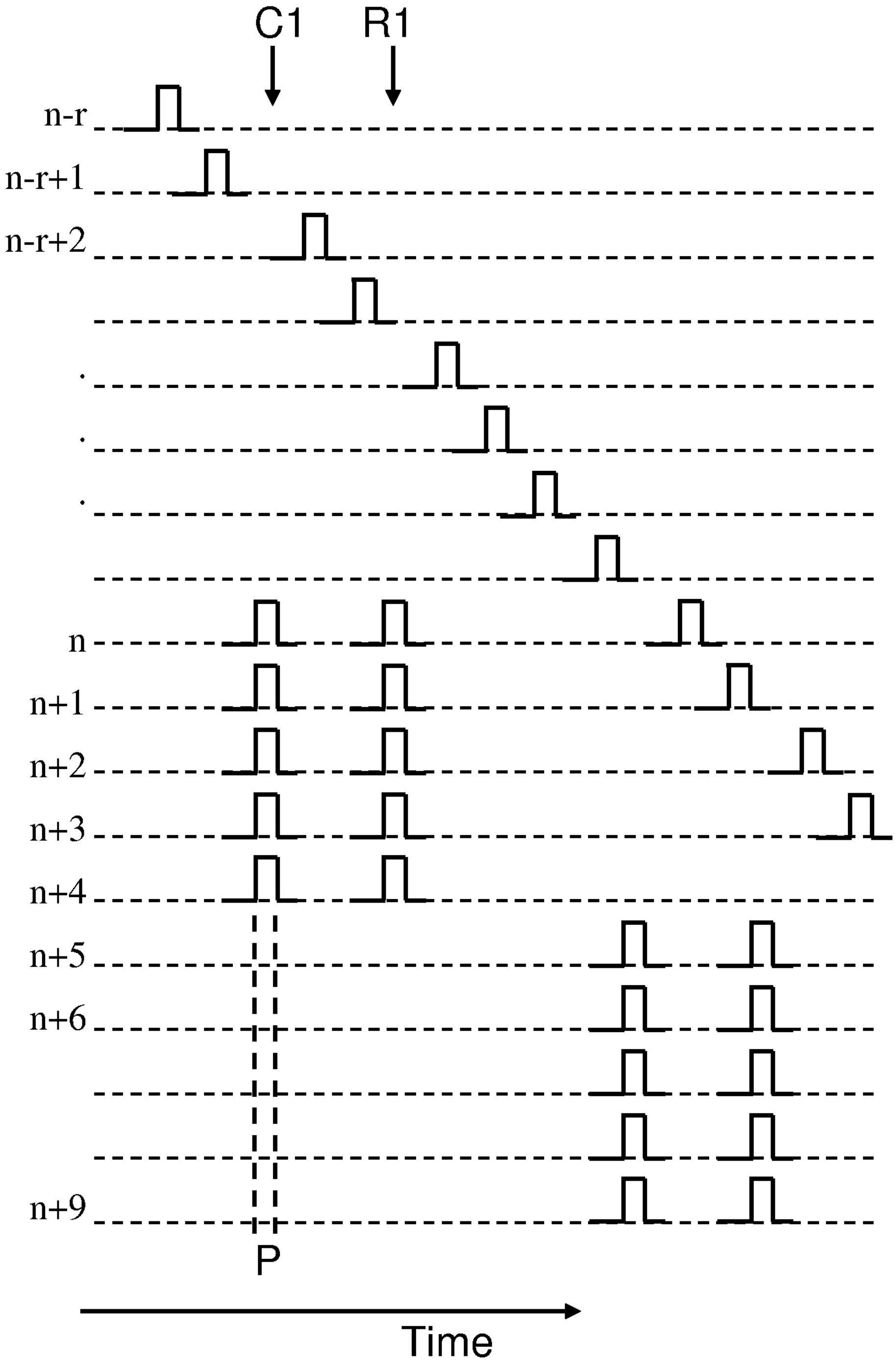
FIG. 7 is a schematic diagram of a preferred embodiment of the present invention, showing an example of timing diagram of the row driver.

FIG. 7 illustrates an example of the preferred operation of the display apparatus of the present invention, wherein n−r, n−r+1, . . . n, n+1, . . . are the indices of LCD scan electrodes of the display apparatus. Each scan electrode select a group of LC cells when its voltage is set to the select voltage. As an illustration without losing generality, the select voltage here is defined as voltage high, and the group of LC cells represents a line of LCD. The vertical axis represents the scan voltage for each of the scan electrodes. A line is selected when the scan voltage is set to a selection voltage (high) for that line. In one part of the operation to address the image data to the display LC cells, the lines are selected (scanned) sequentially, one at a time, to receive the data delivered from the data drivers. Therefore, FIG. 7 illustrates a selection sequence for receiving image data sequentially in the order of n−r, n−r+1, and then n−r+2, . . . . However, in the time period P after the addressing of line n−r+1 and before addressing the line n−r+2, FIG. 7 illustrates a preferred operation of this invention in that all lines from n to n+4 are selected as the scan voltage of all these lines are set to high during the same time period P. the time period mark C1 represents a charging or overcharging operation, and the time period R1 represents a relaxation operation. Such selection of the group of lines is provided for setting all the corresponding LC cells in this group of lines to a charged state or a relaxed state. The normal scan of image data resumes to n−r+2 after setting lines n to n+4. Such operation repeats to the next group as the data addressing and LC operation progresses.

Figure 8:
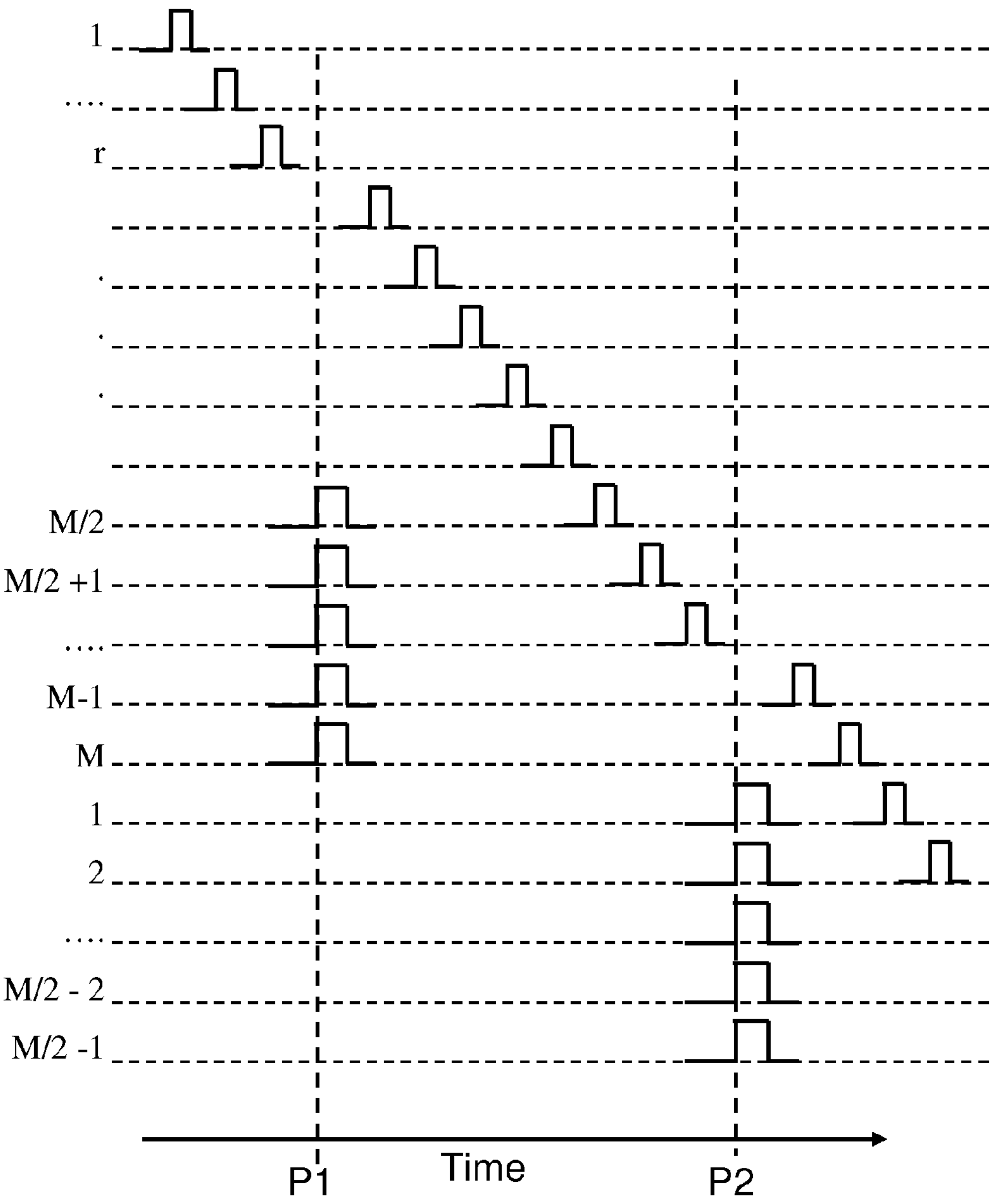
FIG. 8 is a schematic diagram of a preferred embodiment of the present invention with presetting pulses every half frame.

FIG. 8 illustrates a special example of a preferred operation of the present invention wherein only the relaxation operation is shown. In this example, all LC lines M/2 to M is selected in one scan pulse period (at P1) to be set to the relaxed state, and all lines from 1 to (M/2−1) are selected and set to the relaxed state in another scan pulse period (the pulse at P2). Accordingly, this example illustrates an operation that sets one half of the LC display screen to the relaxed state at a time, and sets the other half in another scan pulse period.

Figure 9:
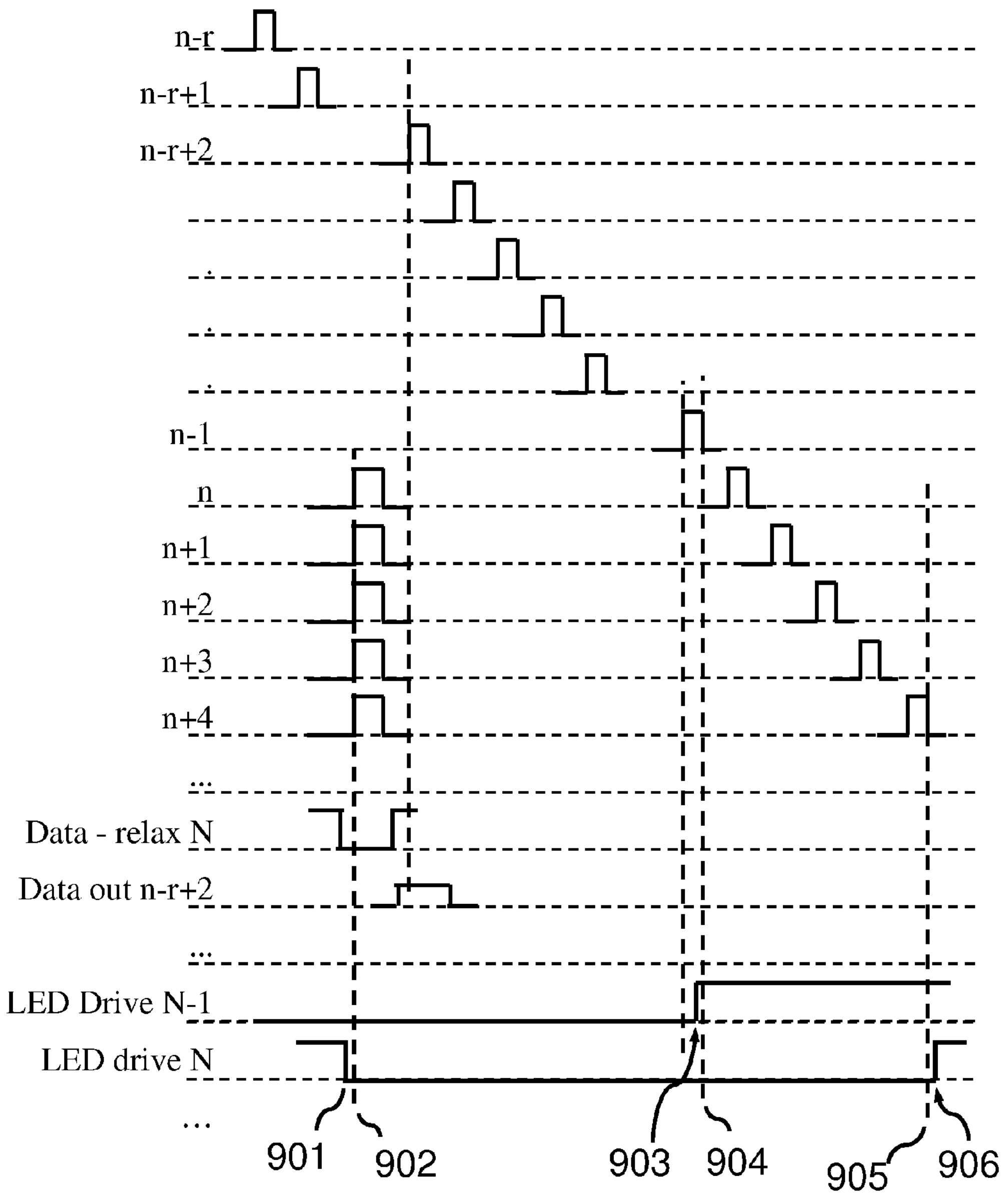
FIG. 9 is a schematic diagram of a preferred embodiment of the present invention.

FIG. 9 illustrates further detail of a preferred operation of the present invention, wherein the data signals and LED drive signals are illustrated in the same timing diagram. The figure illustrates the relaxation operation. Here, as an example of a preferred embodiment, LED element N−1 illuminates the LC lines preceding and up to n−1, and LED element N illuminates LC cells in the group of lines from n to n+4. LED element N−1 is set to off or dim state earlier for setting the LC cells of the previous group (up to line n−1) to the relaxed state. Here, at the time 901 just prior to setting the LC cells in the group of lines n to n+4, LED element N is set to off, thereby turning the light sources illuminating LC lines n to n+4. The LC cells in line n to n+4 are then selected at time 902 and set to the relaxed state therein. During the pulse period of selecting lines n to n+4 at 902, the data signals from date drivers are set to the relaxed voltage (Data−relax N) to discharge the LC cells being selected. After this setting period, the next scan signal is a single pulse selection to select line n−r+2, and the data signals from the data driver resume to the normal image data (Data out n−r+2) for displaying image. As the image data addressing proceeds and completes for the preceding section (up to line n−1) at the time 904, LED element N−1 is turned on at the time 903 and the image in the preceding group is visible. Subsequently, as the image addressing proceeds further and completes for the section of lines n to n+4 in this group at the time 905, the LED element N is turned on at the time 906 and the image in the this section is visible.

Figure 9A:
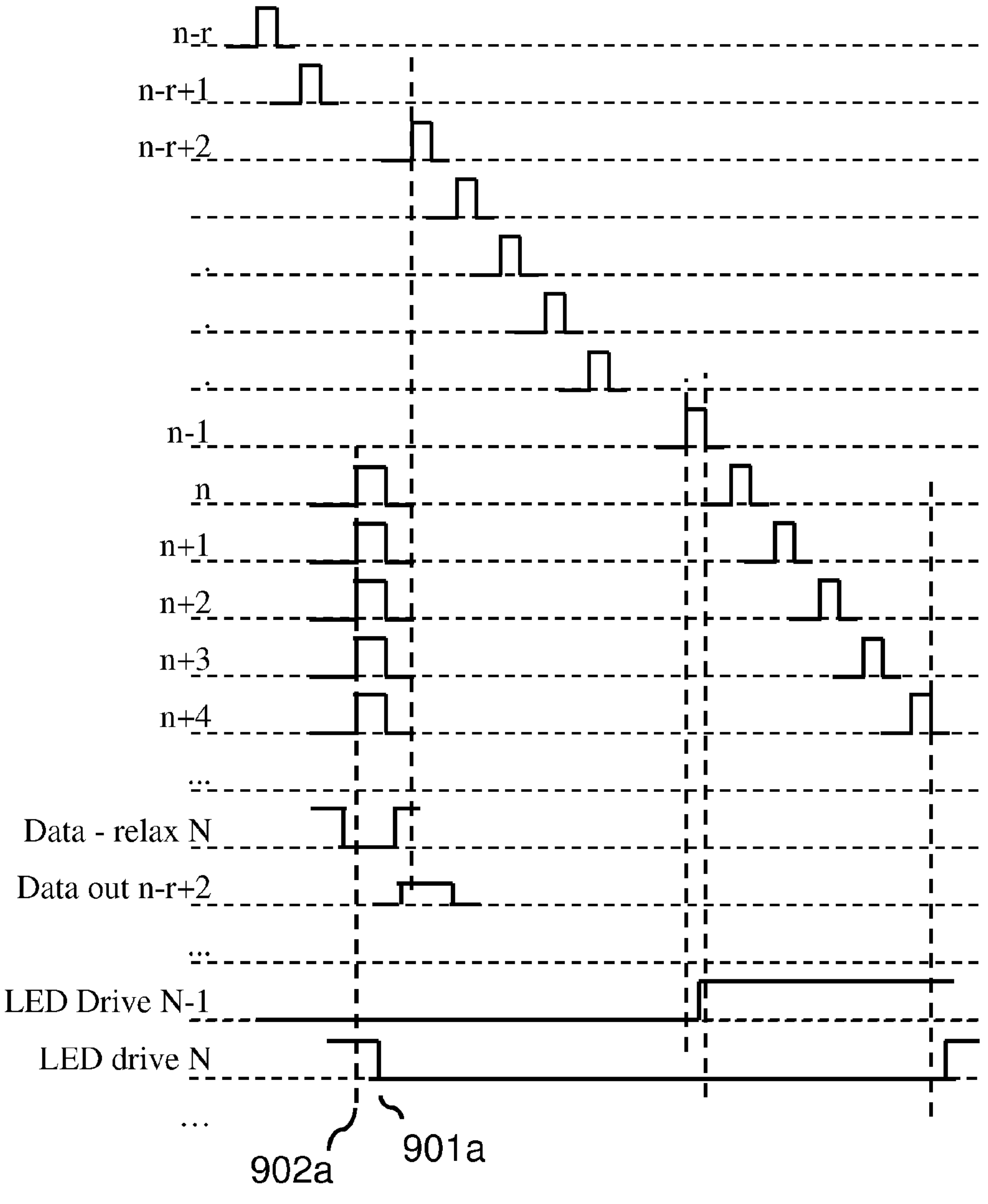
FIG. 9*a* is a schematic diagram of a preferred embodiment of the present invention.

FIG. 9*a* illustrates further detail of another preferred operation of the present invention illustrating the relaxation, wherein the operation is otherwise similar to that of the diagram in FIG. 9, the operation sets the LED element N to off state at the time 901*a* after setting the LC cells in the lines n to n+4 illuminated by LED element N to relaxed state at the time 902*a*. Since the LC's relaxation is slower than the LED's response, the states of the LC cells are not changed substantially until the time 901*a*.

Figure 9B:
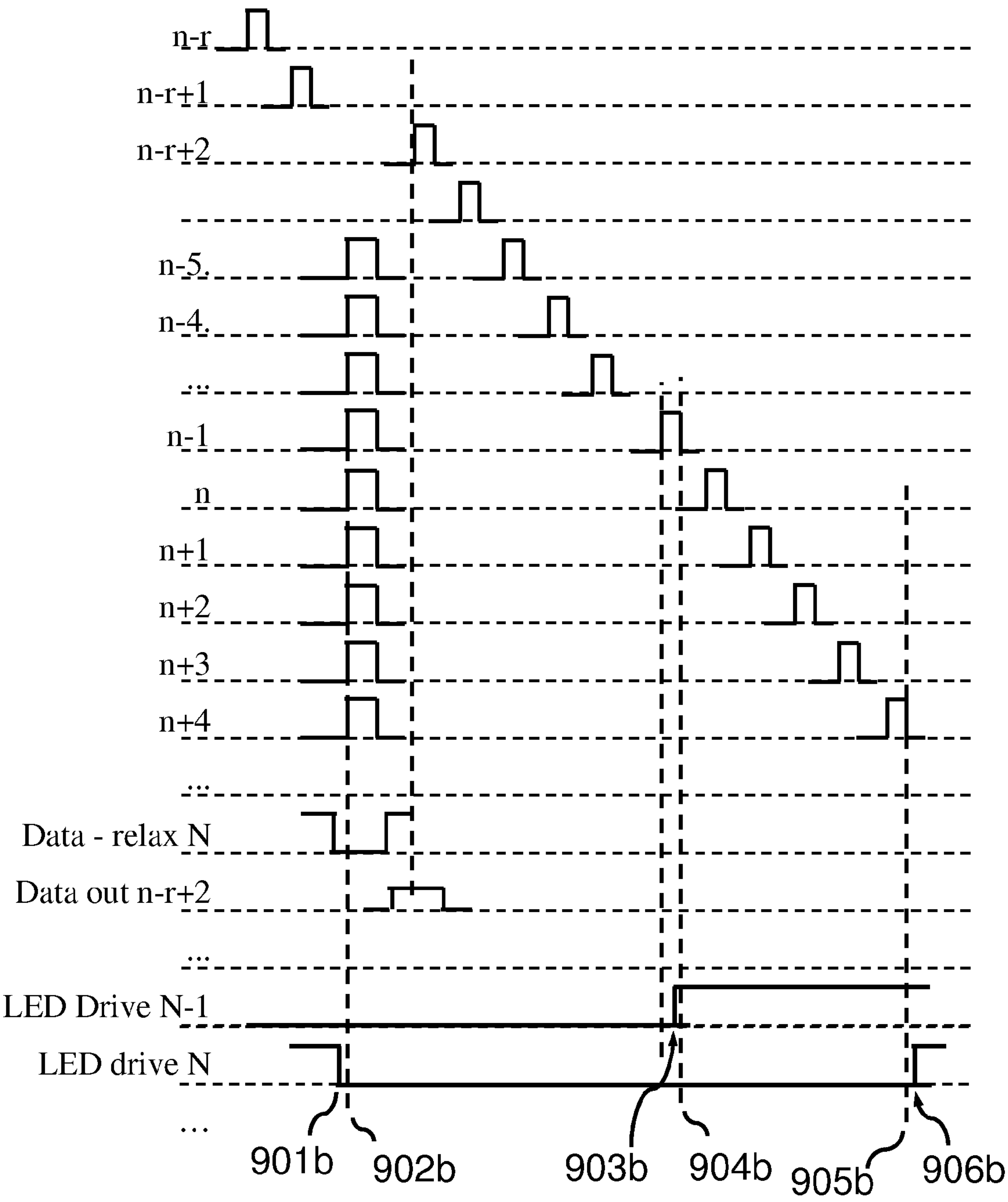
FIG. 9*b* is a schematic diagram of a preferred embodiment of the present invention.

FIG. 9*b* illustrates further detail of a preferred operation of the present invention in reference to the relaxation operation, wherein the data signals and LED drive signals are illustrated in the same timing diagram, and wherein a group of the LC cells are illuminated by more than one LED element. Here, as an example of a preferred embodiment, LC cells in the group of lines n−5 to n+4 are illuminated by LED elements N−1 and N; wherein LED element N−1 illuminates the leading section of the lines in this group and LED element N illuminates the trailing section of lines in this group. There two LED elements overlap and there are LC cells illuminated by both. Since the LED element N−1 also overlaps with its preceding LED element N−2, LED element N−1 is set to off or dim state earlier for setting the LC cells of the previous group to the relaxed state. Here, at the time 901*b* just prior to setting the LC cells in line n−5 to n+4 to the relaxed state, LED element N is set to off, thereby turning all the light sources illuminating LC lines n−5 to n+4 (i.e., both LED elements N−1 and N) off. The LC cells in line n−5 to n+4 are then selected at time 902*b* and set to the relaxed state therein. During the pulse period of selecting lines n−5 to n+4 at 902*b*, the data signals from the date drivers are set to the relaxed voltage (Data−relax N) to discharge the LC cells being selected. After this setting period, the next scan signal is a single pulse selection to address line n−r+2 with image data, and the data signals from the data driver resume to the normal image data (Data out n−r+2) for displaying image. As the image data addressing proceeds and completes for the leading section of this group at the time 904*b*, LED element N−1 is turned on at the time 903*b* and the image in the leading section of the lines in this group is visible. Subsequently, as the image addressing proceeds further and completes for the trailing section of the lines in this group at the time 905*b*, the LED element N is turned at the time 906*b* and the image in the trailing section is visible.

As described herein above, the operation of the display device may continue in a subsequent cycle for another input image data, which may be different from the previous input image data or repeating the same data, with all the operations and variations described above included or partially included in such subsequent operation cycle.

According to the description herein above, the present invention therefore discloses a preferred method of operating a display device where the display device comprises: a plurality of light emitting elements; a plurality of LC cells modulating light output from said light emitting elements; a control circuit performing recurring operations on said light emitting elements and said LC cells; said control circuit operates to address image data to said LC cells. Such preferred method comprises recurring operations:

1) setting a light emitting elements to off or a dimming state;

2) setting a LC cell illuminated by said light emitting element to a relaxed state;

wherein in a refreshing operation cycle, said operation 1) precedes or overlaps operation step 2).

According to the description herein above, the present invention also provide a preferred embodiment of a method of operating a display device; said display device comprising: a plurality of light emitting elements; a plurality of LC cells modulating light output from said light emitting elements to produce images according to input image signals; said method comprising setting said LC cells according to the input image signals to produce said images; wherein, between two settings of said LC cells according to the input image signals where the subsequent image data may be different from or repeating the same of the previous image data, said method further comprising:

1) setting a light emitting elements to off or a dimming state;

2) setting an LC cell illuminated by said light emitting element to a relaxed state.

In a preferred embodiment, the operations or parts of the operations are programmed into an integrated circuit (IC). Such IC comprises the circuit for performing such operations and may also include circuits for peripheral operations such as input and output, and image processing. The control circuit comprises said integrated circuit and is typically fabricated on a printed circuit board with other circuitry, or completely integrated in one IC. In further detail, such control circuit comprises at least a timing management or generating circuitry and control signal circuitry to provide clock and control signals to operate the light emitting element and the LC cells according to the sequences described herein above. Such circuit may be constructed by programming a logic array, or by designing or converting to an application specific IC.

Figure 10:
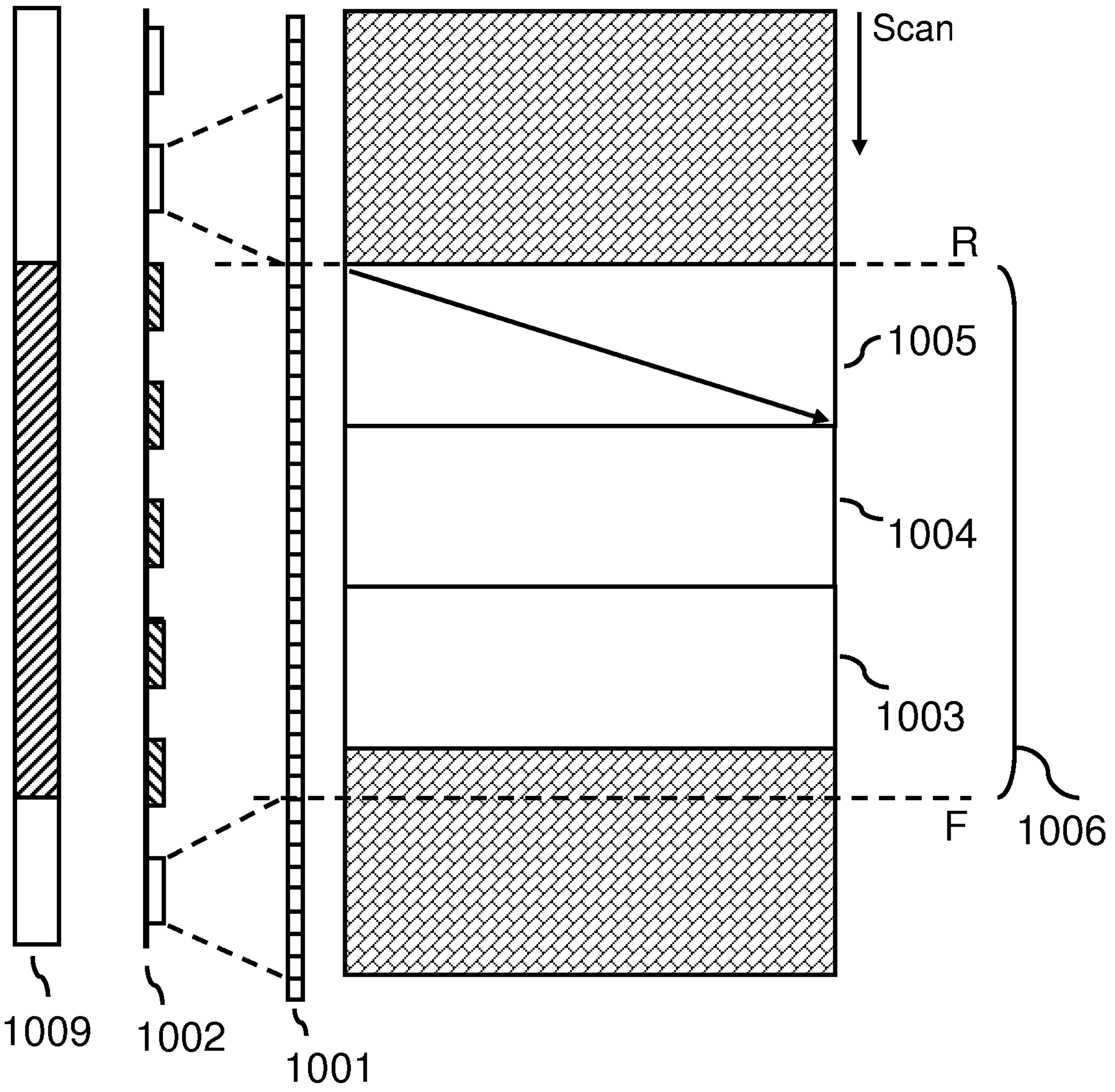
FIG. 10 is a schematic diagram of a preferred embodiment of the present invention showing the sequence of scanning.

FIG. 10 further illustrates the function and progressive operation of the display apparatus of the present invention where 1002 is an array of LED elements, 1001 is an array of LC cells, 1009 indicates the display screen state (either on of off). In this illustration, LC section 1003, 1004, 1005 are set to the relaxed state, and where the LED elements illuminating these LC sections are set to off. Where it is not required that the LC cell sections (1003, 1004, 1005) have a one-to-one match to the LED elements (1006), all the LED elements that illuminate the sections of the LC cells in area 1006 that are set to the relaxed state need to remain in the off state.

Furthermore, as described in paragraphs 44-47 to 62, 64, 68, and 70 to 74, the present invention provides a control circuit and a drive circuit to enable the selection of all LCD lines in a section, as illustrated by area 105 of FIG. 1*a* and described in paragraph 46 and 47. A scan driver is so constructed and assembled with the display apparatus to operate to select all lines corresponding to the cells in area 105. Furthermore, a data driver is constructed and assembled in the display to deliver a data signal synchronously with the scan driver to set all data lines to a voltage state corresponding to the relaxed state of the LC cells.

Furthermore, the present invention provides a circuit that selects a group of LC rows for applying a charging or overcharging signal, and subsequently to select the same group of rows of LC cells for applying a signal to set the LC cells to the relaxed state. This function if depicted in FIG. 7 by C1 and R1.

A typical liquid crystal display comprises scan electrodes for selection and data electrodes for delivering image data to the LC cells. Each LC cell comprises a thin-film transistor (TFT) having a gate terminal and a data terminal (drain terminal of the TFT) A plurality of LC cells, typically a row of LC cells, are connected via the gate terminals to a scan electrode. Applying a SELECT signal on a scan electrode selects all cells connected thereto to receive image data from the data electrode.

A preferred embodiment of the scan driver circuit in the present invention comprises a plurality of output terminals for operating a liquid crystal display, wherein each output terminal operates to deliver a SELECT signal successively and cyclically according to a control timing to enable the liquid crystal cells connected thereto to receive image data, and to inhibit data transfer to said cells when said SELECT signal is absent or disabling; wherein said scan driver further comprises a recurring discharge operation according to a control signal. In a preferred embodiment, each said discharge operation operates on a section of the scan output terminals simultaneously, i.e., all terminals in a section are set to a discharging signal during said discharge operation, thereby performing discharge operation on all LC cells connected to said section of the scan output terminals. In an alternative embodiment, all scan terminals are operating discharge simultaneously each time, thereby performing discharge operation on all LC cells in the display together. In another alternative embodiment, the discharge operation is performed one scan terminal at a time sequentially.

A preferred discharge operation comprises delivering a discharge signal at said section of or all output terminals simultaneous. A preferred discharge signal is a signal the select all cells connected thereto to receive a discharge data voltage from the data electrodes. Such a signal is preferably the same as the SELECT signal. The scan driver described here may be constructed in an integrated circuit on silicon.

An embodiment of a charging operation in the present invention comprises a selection of a group of rows with the scan driver and applying a charging voltage via the data driver on all the data terminals.

Accordingly, the present invention further provides a driver circuit comprising the scan driver described above, and a data driver circuit for delivering image data to its data output terminals according to the input image signal; wherein during a charging period, output terminals of the data driver are set to a charging voltage; and wherein during said discharging operation, output terminals of said data driver are set to a discharge voltage according to a control signal.

A preferred embodiment of the driver circuit in the present invention operates a recurring function comprising:

1. setting all data output terminals to a charging voltage;
2. enabling all scan output terminals;
3. setting all data output terminals to a discharging voltage;
4. disabling all scan output terminals;
5. setting data output terminals according to input image signal;
6. enabling a scan output terminals;
7. repeating step 5 and 6 on another scan output terminal;

wherein in an operation cycle, operation 1) precedes or overlaps 3), 3) precedes 5). Such driver circuit may be constructed in a single chip integrated circuit.

FIGS. 11 and 12 illustrate the function of the scan driver circuit described in the preceding paragraph. FIG. 11 is the conventional driver for scan-select. FIG. 12 provides the driver with an additional control signal, "act all", and the additional function in the last row, where when act all is set to enable (H), all output terminals are set to enable state (H). The enabling of "act all" and the enable states of the output terminal can be either high or low, depending on the logic and drive configuration. Since the operation of charging and relaxation may be performed in one continuous long period or in two separate short periods, a further embodiment of the scan driver comprises a dual selection separated by a number of signal selection pulses for each operation cycle.

Accordingly, the present invention provides an integrated driver circuit comprising a data driver circuit for delivering image data to its data output terminals according to the input image data, a scan driver for successively enabling its scan output terminals; wherein said scan driver further comprises a recurring charging operation and discharge operation according to a control signal. Such charging and discharging operations enable a plurality of scan output terminals simultaneously at a defined time according to the control signal; wherein during the charging operation, the output terminals of the data driver are set to a charging voltage, and wherein during said discharging operation, output terminals of said data driver are set to a discharge voltage according to a control signal. Such integrated driver circuit is preferably made in a single silicon chip. In an alternative implementation of such driver circuit, a conventional driver is used to connect external pull-up or pull down circuit that active all the output terminals via a separate section of external circuitry.

Accordingly, another preferred embodiment of the present invention is a display apparatus comprises an integrated driver circuit described in the previous paragraph which operates a recurring function comprising:

1. Setting all terminals in a section to a charging or over-charging voltage;
2. enabling all scan output terminals,
3. setting all data output terminals to a discharging voltage,
4. disabling all scan terminals,
5. setting data output terminals according to image data,
6. enabling a scan output terminals,
7. repeating step 4 and 5 on another scan output terminal, wherein in an operation cycle, operation 1 precedes or overlaps 2, or trails 2 by a fraction of the response of the LC cells, 2 precedes 3, and 3 precedes 4.

An example of the application of the present invention is the handheld apparatus, such as a cellphone, comprising the integrated driver circuit according to previous paragraph and a display device, said display device comprising a plurality of light valves connected to said integrated driver; wherein said plurality of light valves are structured into a plurality of subsets, each subset comprising a group of light valves; wherein a scan output terminal controlling the selection of a said subset for receiving said data; wherein said integrated driver further sets a plurality of said subsets to a relaxed state during said discharging operation.

Various structures may be used to achieve the function of the circuit operation and timing scheme of the display disclosed in the present invention. Specific preferred embodiments of its construction were provided in this description to illustrate the driving scheme, operation principles, and functional definition of the driver, of this invention. The application of the principles of the present invention, however, is not limited by such examples. It is conceivable that various types of circuit implementation and cell assembly may be used to construct such display and operate under the principles of the present invention. All such variations are embraced by the present invention.

Although various embodiments utilizing the principles of the present invention have been shown and described in detail, it is perceivable those skilled in the art can readily devise many other variances, modifications, and extensions that still incorporate the principles disclosed in the present invention. The scope of the present invention embraces all such variances, and shall not be construed as limited by the number of elements, specific arrangement of groups as to rows and column, and specific circuit embodiment to achieve the architecture and functional definition of the present invention.

What is claimed is:

1. An image display device comprising:

a plurality of light emitting elements;

a light modulator comprising a plurality of light valves modulating light directed thereto;

a plurality of data electrodes for applying data voltages to said light valves;

a control circuit comprising circuits connected to said light emitting elements and light valves and a timing sequence that generates and applies recurring control signals on said light emitting elements and said light valves according to said timing sequence; said timing sequence comprising:

a recurring signal period comprising a first signal that sets a light valve to a transmission state and a subsequent second signal that decreases the transmission level of said light valve;

a third signal decreasing the light intensity of the light emitting element illuminating said light valve, wherein said third signal is no later than said first signal;

a fourth signal to increase the light intensity after said second signal;

wherein no intervening signal cycle between said third and fourth signals that increases and later decreases the light intensity of said light emitting element;

wherein no intervening signal cycle between said first and said second signals that decreases and subsequently increases the transmission of said light valve;

no intervening signal cycle between said second and said fourth signals that increases and subsequently decreases the transmission of said light valve;

wherein said timing sequence further comprises a fifth signal setting said light valve to the black state that inhibits light transmission;

wherein in a cycle ending at said second signal, said fifth signal setting said light valve to the black state precedes said first signal; wherein the time interval between said third and said fourth signals is shorter than the time interval of two image frames.

2. The image display device according to claim 1, comprising:

a plurality of light emitting elements; a light modulator comprising a plurality of light valves modulating light directed thereto;

a plurality of data electrodes for applying data voltages to said light valves;

a control circuit comprising circuits connected to said light emitting elements and light valves and a timing sequence that generates and applies recurring control signals on said light emitting elements and said light valves according to said timing sequence;

said timing sequence comprising: a recurring signal period comprising a first signal that sets a light valve to a transmission state and a subsequent second signal that decreases the transmission level of said light valve;

wherein the light emitting element illuminating said light valve is set to the lowest intensity at a time t3 no later than said first signal and remains at the lowest intensity, i.e. dimming state, for the entire time of said signal period, and wherein said light emitting element is set to increase light intensity at a time t4 after said signal period;

wherein the time interval between t3 and t4 is shorter than the time interval of one image frames;

wherein said timing sequence further comprises a signal setting of said light valve to the black state that inhibits light transmission;

wherein in a cycle ending at said second signal, said signal setting said light valve to the black state precedes said first signal.

3. The image display device according to claim 2 comprising:

a plurality of light emitting elements;

a light modulator comprising a plurality of light valves modulating light directed thereto;

a plurality of data electrodes for applying data voltages to said light valves; a control circuit connected to said light emitting elements and light valves, and generating and applying recurring control signals thereto on said light emitting elements and said light valves according to a pre-determined signal timing sequence;

said timing sequence operations comprising:

1) a control signal s1 setting a light emitting element to a dimming state;

2) a control signal s2 setting a light valve in the area illuminated by said light emitting element to a relaxed state which corresponds to a transmission state allowing light transmission, and a subsequent control signal s3 decreasing the transmission of said light valve; and 3) a control signal s5 setting said light valve to the minimum transmission;

wherein said control circuit generates and applies signals to said light emitting elements and light valves in an operation cycle according to said timing sequence, wherein in a recurring cycle ending at signal s3, said signal s1 setting said light emitting element to the dimming state in operation 1) occurs before said light valve changes its optical state to said transmission state by the control signal s2 in operation 2); wherein said light emitting element is set to remain in said dimming state until the control signal s3 in operation 2);

4) a signal s4 after said signal s3 setting said light emitting element to increase intensity; no intervening signal cycle between s3 and s4 that sets said light valve to increase and subsequently decrease transmission;

wherein said control signal s5 in operation 3) precedes s2 of operation 2);

wherein the control signal s1 of operation 1) is no later than said light valve changing to minimum transmission by the control signal s5 of operation 3);

wherein the time interval between s1 and s4 is shorter than the time of two frames.

4. The image display device according to claim 3, wherein said control circuit comprises circuit that generates and applies recurring signals to said light emitting elements and light valves according to said timing sequence that comprises recurring signal operations on said light emitting elements and said light valves; said subsequent control signal of said operation 2) decreases light transmission of said light valve to a state according to input image data to produce image.

5. The display device according to claim 4, wherein said operation step 1) sets all said light emitting elements to a dimming state, and wherein said step 2) applying a control signal sets all light valves to a transmission state.

6. The display device according to claim 4, wherein said control circuit further comprises an operation of 4) setting the light emitting element that has been set to dimming state in said operation 1) to a bright level according to a scaling relation;

said scaling relation determining said brightness level in a manner that the brightness level increases or decreases according to the average or maximum brightness of the image in an area surrounding said light valve;

said scaling relation provides a brightness level that increases with increasing average brightness;

wherein said operation 2) precedes said operation 4).

7. The display device according to claim 3, wherein said plurality of light valves and said light emitting elements are arranged separately in plurality of groups;

wherein said control circuit comprises circuit that generates and applies signals to said light emitting elements and light valves according to said timing sequence in which the groups of light valves are set in coordination with the groups of light emitting elements;

wherein said timing sequence comprises 1) a control signal s1 applied on a group of light emitting elements, setting the light emitting elements in the group to a dimming state, and 2) a control signal s2 applied on a group of light valves illuminated by said group of light emitting elements to a transmission state, and a subsequent control signal s3 to decrease transmission;

wherein in an operation cycle, said s1 is no later than s2.

8. The display device according to claim 3, wherein a group of said light valves are arranged to connect to a first common electrode, and wherein said control circuit generates and applies signals according to said timing sequence in which said s2 setting a light valve to a transmission state, sets said light valve by applying a control voltage to said first common electrode.

9. The display device according to claim 8, wherein said common electrode connects to all light valves of the display, wherein said s2 applying a control signal sets all light valves by applying a voltage to said common electrode, thereby setting all light valves to a transmission state.

10. The display device according to claim 3, wherein a group of said light emitting elements are arranged to connected to a second common electrode, wherein said control circuit generates and applies signals according to said timing sequence in which step 1) sets the group of light emitting elements by applying a control voltage to the second common electrode.

11. The display according to claim 3, wherein the transmission state of a light valve corresponds to a state where the voltage applied on the light valve is zero or near zero.

12. The display according to claim 3, wherein said plurality of light valves form array of cells; said control circuit comprising at least a data driver circuit for delivering image data to said light valves, and at least a scan driver circuit for selecting light valve cells to receive the image data according to a control timing; wherein said scan driver comprising a plurality of output terminals each connecting to a plurality of light valve cells via a scan electrode;

wherein said scan driver further comprises circuit to generate and apply recurring control signals that simultaneously select a plurality of said scan driver terminals at a time so that all light valves connected to said group of scan driver output terminals are set at the same time to receive a signal which reduces the voltage of light valve to zero;

wherein said timing sequence sets said all control signals in 1), 2) and 3) within 30 milliseconds in one recurring cycle.

13. The display according to claim 12, wherein said data driver further generates and applies signals to said light valves according to a timing sequence that comprises a signal to set a discharging voltage to its data output terminals;

wherein said discharging voltage reduces the voltage of light valve to zero during the period when said scan driver applies the signal that simultaneously select a plurality of terminals, wherein said discharging voltage reduces the light vales connected to the selected terminals to zero voltage.

14. The display device according to claim 3, wherein said plurality of light emitting elements are arranged in N groups;

wherein the control circuit sets all light emitting elements in a group to a dimming state in step 1) of an operation cycle;

wherein the area of the light valves under the illumination of said group of light emitting elements is smaller than 4A/N;

where A is the total surface area of said light modulator comprising a plurality of light valves.

15. The image display device according to claim 3, wherein said transmission state set by the first control signal in said operation 2) allows maximum light transmission.

16. A device comprising:

a timing control circuit comprising logic circuit and a build-in pre-determined timing sequence;

a scan driver circuit comprising a plurality of output terminals for driving operating a liquid crystal display, wherein said scan driver comprises circuit that sets a sequential SELECT signal to said output terminals, one at a time, successively according to said timing sequence to enable the liquid crystal cells connected thereto to receive voltage signals, and to inhibit signal transfer to said cells when said sequential SELECT signal is absent;

wherein said scan driver further comprises circuit that generates and applies recurring simultaneous SELECT signal to a SECTION comprising a plurality of its output terminals that enables all light valves connected to said SECTION to receive voltage signal at the same time according to the pre-determined timing sequence wherein said scan driver generates and applies a reference voltage that sets all light valves connected to said SECTION plurality of output terminals to a positive voltage during a first simultaneous SELECT signal, and subsequently during a second simultaneous SELECT signal sets said all light valves to zero voltage; wherein said second simultaneous SELECT signal is followed by said sequential SELECT signal;

wherein during said sequential SELECT signals, at least one light valve connected to said SECTION is set to a non-zero voltage;

wherein said device further comprises a lighting control circuit connected to a plurality of light emitting elements;

wherein said lighting control circuit is controlled by said timing control circuit to set the intensity of said light emitting elements;

wherein during the time of said second simultaneous SELECT signal, said lighting control circuit sets to decrease to minimum intensity all light emitting elements that illuminate light valves connected to said SECTION;

said lighting control circuit maintains this minimum intensity setting until said sequential SELECT signal is applied to the last output terminal in said SECTION.

17. The circuit according to claim 16, wherein said SECTION comprises all output terminals of said scan driver.

18. The circuit according to claim 16, further comprising:

a data driver circuit for delivering voltage signal to its data output terminals according to the input image signal; wherein during the period of said second simultaneous SELECT signal, an output terminals of said data driver delivers a voltage that reduces the voltage of all light valves connected thereto toward zero.

19. The circuit according to claim 18, further comprises circuit that generates control signals operating a recurring function comprising:

1) setting all data output terminals to a non-zero voltage which sets a light valve to the minimum transmission;

2) applying simultaneous SELECT signal to all scan output terminals;

3) setting all data output terminals to decrease to zero voltage;

4) removing SELECT signal from all scan output terminals;

5) setting data output terminals according to input image signal;

6) applying sequential SELECT signal to a scan output terminals;

7) repeating 5) and 6) on another scan output terminal;

wherein said control signals are generated according to a timing sequence in which in an operation cycle, operation 1) precedes 3), 3) precedes 5).

20. An image display device comprising a plurality of light emitting elements and a plurality of light valves, a circuit comprising current sources connecting to and supplying current to said light emitting elements, voltage sources connecting and supplying voltage signals to a plurality of light valves;

a signal timing sequence that comprises recurring control signals to set the light emitting elements and light valves;

said signal timing sequence comprising:

1) a first control signal that sets to decrease a current source and subsequently a fifth control signal to increase the current;

wherein said circuit maintains the current setting of said current source not to increase the current for the entire time between said first control signal and said fifth control signal;

2) a second control signal that sets a plurality of voltage sources to increase voltage;

3) subsequent to said second signal, a third control signal that sets said plurality of voltage sources to zero or near zero, and subsequently a fourth control signal that increases the voltage of said plurality of voltage sources;

no intervening signal cycle that sets said voltage sources to decrease and subsequently increase in the time between said first and said third control signals;

no intervening signal cycle between said third and said fourth control signals that sets said voltage sources to increase and subsequently sets to decrease during the time;

no intervening signal cycle that sets said voltage sources to decrease and subsequently increase in the time between said fourth and said fifth control signals;

wherein said current source in 1) supplies current to at least a light emitting element, and wherein said voltage sources in 2) supply voltage signals to a plurality of light valves;

wherein said circuit generates and applies signals to said light emitting elements and light valves according to said timing sequence wherein said first control signal is no later than said third control signal and wherein said fourth control signal is no later than said fifth control signal;

wherein the time interval between said first and said fifth control signals is shorter than the time interval of two frames.

21. The image display device according to claim 20 comprising a plurality of light emitting elements and a plurality of light valves, a circuit comprising current sources connecting to and supplying current to said light emitting elements, voltage sources connecting and supplying voltage signals to a plurality of light valves; a recurring signal timing sequence that comprises recurring control signals to set the light emitting elements and light valves;

said signal timing sequence comprising:

1) a first control signal that sets a current source to the lowest current level and subsequently a fifth control signal to increase the current;

said circuit maintains the same minimum current setting for said current source after said first signal for the entire time between said first control signal and said fifth control signal;

2) a second control signal that sets a plurality of voltage sources to increase voltage;

3) subsequent to said second signal, a third control signal that sets said plurality of voltage sources to zero or near zero, and subsequently a fourth control signal that increases the voltage of said plurality of voltage sources;

no intervening signal cycle between said third and said fourth control signals that sets said voltage sources to decrease and subsequently sets to increase during the time;

wherein said current source in 1) supplies current to a light emitting element, and wherein said voltage sources in 2) supply voltage signals to a plurality of light valves;

wherein said circuit generates and applies signals to said light emitting elements and light valves according to said timing sequence wherein so that the said first control signal is no later than said third control signal and wherein said fourth control signal is no later than said fifth control signal;

wherein the time span between said first and said fifth control signals is not longer than the time of one image frame.

22. The device according to claim 21, further comprising:

a plurality of light emitting elements;

a plurality of light valves modulating light directed thereto from said light emitting elements to produce images according to input image signals;

wherein said current source supplies drive current to said light emitting elements, and said voltage source supplies voltage signals to said light valves according to input image.

23. A method of operating a display device, said display device comprising:

a plurality of light emitting elements; a plurality of light valves modulating light output from said light emitting elements;

said method comprising recurring operations and a timing sequence of:

1) setting a light emitting element to decrease light intensity;

2) setting a light valve illuminated by said light emitting element to a first transmission state, and subsequently applying a signal to said light valve to decrease the light transmission;

3) setting said light valve to the minimum transmission;

wherein said light emitting element is set to decrease light intensity no later than the light valve changing to the transmission state in step 2), and not to increase light intensity for the entire period when said light valve is set to said first transmission state;

4) setting said light emitting element to increase intensity after said operation step 2);

wherein said operation 3) precedes operation 2);

wherein a sequence containing all signal settings of 1), 2), 3) and 4) is in a time interval shorter than the time interval of two image frames.

24. The method of operating a display device according to claim 23, said display device comprising: a plurality of light emitting elements;

a plurality of light valves modulating light output from said light emitting elements;

said method comprising recurring operations and a timing sequence of:

1) setting a light emitting element to a dimming state;

2) setting a light valve illuminated by said light emitting element to a relaxed state which corresponds to a first transmission state, and subsequently applying a signal to said light valve to decrease the light transmission;

3) setting said light valve to a fully charged or over-charged state which corresponds to the minimum transmission;

wherein said light emitting element is set to the dimming state and remains in the dimming state for the entire period when said light valve is set to said first transmission state, and 4) wherein said light emitting element is set to increase light intensity after said subsequently applied signal of step 2) that decreases the transmission of said light valve; wherein a sequence containing all signal settings of 1), 2), 3) and 4) is in a time interval shorter than the time interval of two image frames;

wherein in an operation period ending at step 4), said operation 3) precedes operation 2).

25. The method according to claim 24, further comprising recurring operations of:

1) setting a light emitting element to a dimming state;

2) applying a first control signal for setting a light valve illuminated by said light emitting element to a relaxed state which corresponds to a light transmission state, and subsequently applying a second signal to decrease light transmission of said light valve;

3) applying a control signal for setting said light valve to a fully charged state which correspond to minimum light transmission;

said second signal in operation step 2) decreases transmission of said light valve according to image data; wherein said operation step 3) precedes 2), and 1) is no later than 2); wherein said light emitting element remains in the dimming state for the entire period between said first signal and said second signal of step 2), and is set to increase light intensity after said second signal.

* * * * *